United States Patent
Wang et al.

(10) Patent No.: US 12,245,072 B2
(45) Date of Patent: *Mar. 4, 2025

(54) SUPPORTING A LARGE NUMBER OF DEVICES IN WIRELESS COMMUNICATIONS

(71) Applicant: INTERDIGITAL PATENT HOLDINGS, INC., Wilmington, DE (US)

(72) Inventors: Xiaofei Wang, North Caldwell, NJ (US); Lei Wang, San Diego, CA (US); Sudheer A. Grandhi, Pleasanton, CA (US); Guodong Zhang, Woodbury, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/537,598

(22) Filed: Dec. 12, 2023

(65) Prior Publication Data

US 2024/0121660 A1  Apr. 11, 2024

Related U.S. Application Data

(63) Continuation of application No. 17/993,187, filed on Nov. 23, 2022, now Pat. No. 11,843,970, which is a
(Continued)

(51) Int. Cl.
*H04W 28/02* (2009.01)
*H04W 52/02* (2009.01)
*H04W 72/23* (2023.01)

(52) U.S. Cl.
CPC .......... *H04W 28/0278* (2013.01); *H04W 52/0216* (2013.01); *H04W 52/0219* (2013.01);
(Continued)

(58) Field of Classification Search
CPC ......... H04L 47/10; H04L 47/30; H04L 47/11; H04L 47/12; H04W 28/0278;
(Continued)

(56) References Cited

U.S. PATENT DOCUMENTS

| 5,818,826 A | 10/1998 | Gfeller et al. |
| 6,804,542 B1 | 10/2004 | Haartsen et al. |

(Continued)

FOREIGN PATENT DOCUMENTS

| CN | 101087172 | 12/2007 |
| CN | 102065525 | 5/2011 |

(Continued)

OTHER PUBLICATIONS

Abraham et al., "Short Beacon," IEEE 802.11-11/1503r2 (Nov. 2011).
(Continued)

*Primary Examiner* — Peter G Solinsky
*Assistant Examiner* — Sanjay K Dewan
(74) *Attorney, Agent, or Firm* — VOLPE KOENIG

(57) ABSTRACT

A method for receiving a backoff value at a wireless station is presented. A traffic indication map is received at the station, wherein a backoff number is implicitly assigned to the station based on a position of the station within the traffic indication map. The backoff value is determined by multiplying the backoff number by a predetermined time value.

20 Claims, 13 Drawing Sheets

Related U.S. Application Data continuation of application No. 16/854,588, filed on Apr. 21, 2020, now Pat. No. 11,516,701, which is a continuation of application No. 15/850,841, filed on Dec. 21, 2017, now Pat. No. 10,667,169, which is a continuation of application No. 13/785,842, filed on Mar. 5, 2013, now Pat. No. 9,854,469.

(60) Provisional application No. 61/696,607, filed on Sep. 4, 2012, provisional application No. 61/669,274, filed on Jul. 9, 2012, provisional application No. 61/607,354, filed on Mar. 6, 2012.

(52) U.S. Cl.
CPC ............. *H04W 72/23* (2023.01); *Y02B 70/30* (2013.01); *Y02D 30/70* (2020.08)

(58) Field of Classification Search
CPC ......... H04W 52/0216; H04W 52/0219; H04W 72/23; H04W 72/231; H04W 72/232
USPC ....................................................... 370/229
See application file for complete search history.

(56) References Cited

U.S. PATENT DOCUMENTS

| | | | |
|---|---|---|---|
| 7,058,071 B1 | 6/2006 | Myles et al. | |
| 7,620,027 B2 | 11/2009 | Igarashi et al. | |
| 8,135,445 B2 | 3/2012 | Lee et al. | |
| 8,717,959 B2 | 5/2014 | Vedantham et al. | |
| 8,848,656 B2 | 9/2014 | Horn et al. | |
| 10,581,829 B1 | 3/2020 | Don et al. | |
| 2002/0075814 A1 | 6/2002 | Desai et al. | |
| 2002/0154653 A1 | 10/2002 | Benveniste et al. | |
| 2003/0053480 A1* | 3/2003 | Jang | H04L 12/413 370/445 |
| 2003/0103521 A1 | 6/2003 | Raphaeli et al. | |
| 2003/0145095 A1 | 7/2003 | Liu et al. | |
| 2004/0095911 A1* | 5/2004 | Benveniste | H04W 74/02 370/347 |
| 2004/0264397 A1 | 12/2004 | Benveniste | |
| 2005/0003794 A1 | 1/2005 | Liu | |
| 2005/0025092 A1 | 2/2005 | Morioka et al. | |
| 2005/0063348 A1 | 3/2005 | Donovan et al. | |
| 2006/0034219 A1 | 2/2006 | Gu et al. | |
| 2006/0067244 A1 | 3/2006 | Sekaran et al. | |
| 2006/0114878 A1 | 6/2006 | Choe et al. | |
| 2007/0127380 A1 | 6/2007 | Abraham et al. | |
| 2007/0207765 A1 | 9/2007 | Nakahara et al. | |
| 2007/0269041 A1 | 11/2007 | Bhatnagar et al. | |
| 2007/0287456 A1 | 12/2007 | Shimizu et al. | |
| 2008/0032662 A1 | 2/2008 | Tu et al. | |
| 2008/0146253 A1* | 6/2008 | Wentink | H04W 68/02 455/458 |
| 2008/0181154 A1 | 7/2008 | Sherman et al. | |
| 2008/0220770 A1 | 9/2008 | Qi et al. | |
| 2009/0066540 A1 | 3/2009 | Marinakis et al. | |
| 2009/0122705 A1 | 5/2009 | DeVal et al. | |
| 2009/0224876 A1 | 9/2009 | McCall et al. | |
| 2009/0305734 A1* | 12/2009 | Toshimitsu | H04W 56/00 455/509 |
| 2010/0002612 A1 | 1/2010 | Hsu et al. | |
| 2010/0008278 A1 | 1/2010 | Kone et al. | |
| 2010/0267407 A1 | 10/2010 | Liao et al. | |
| 2010/0284321 A1 | 11/2010 | Zhang | |
| 2011/0044220 A1 | 2/2011 | Park et al. | |
| 2011/0053657 A1 | 3/2011 | Ji et al. | |
| 2011/0086661 A1 | 4/2011 | Yamamoto | |
| 2011/0103281 A1 | 5/2011 | Son et al. | |
| 2011/0158144 A1 | 6/2011 | Sung et al. | |
| 2011/0185010 A1 | 7/2011 | Shatsky et al. | |
| 2011/0274040 A1 | 11/2011 | Pani et al. | |
| 2012/0002574 A1 | 1/2012 | Lee et al. | |
| 2012/0051338 A1 | 3/2012 | Seok | |
| 2012/0127865 A1 | 5/2012 | Nakae et al. | |
| 2012/0313761 A1 | 12/2012 | Rolin et al. | |
| 2013/0070627 A1 | 3/2013 | Chen et al. | |
| 2013/0143606 A1 | 6/2013 | Merlin et al. | |
| 2013/0208637 A1 | 8/2013 | Abraham et al. | |
| 2013/0208667 A1 | 8/2013 | Merlin et al. | |
| 2013/0235720 A1 | 9/2013 | Wang et al. | |
| 2013/0287043 A1 | 10/2013 | Nanda et al. | |
| 2014/0004865 A1 | 1/2014 | Bhargava et al. | |
| 2014/0092733 A1 | 4/2014 | Johansson et al. | |
| 2014/0169290 A1 | 6/2014 | Seok et al. | |
| 2014/0204822 A1 | 7/2014 | Park et al. | |
| 2015/0289197 A1 | 10/2015 | Ghosh et al. | |
| 2016/0174262 A1 | 6/2016 | Xing et al. | |
| 2016/0330788 A1 | 11/2016 | Zheng et al. | |
| 2019/0182772 A1 | 6/2019 | Larmo et al. | |

FOREIGN PATENT DOCUMENTS

| | | |
|---|---|---|
| CN | 102172094 | 8/2011 |
| CN | 102186229 | 9/2011 |
| EP | 1 903 815 | 3/2008 |
| EP | 1 521 402 | 4/2009 |
| EP | 2 823 674 | 1/2015 |
| GB | 2 415 573 | 12/2005 |
| JP | 2006-352806 | 12/2006 |
| JP | 2007-520968 | 7/2007 |
| JP | 2007-201781 | 8/2007 |
| JP | 2012-503918 | 2/2012 |
| JP | 5957545 | 7/2016 |
| KR | 2010-099969 | 9/2010 |
| KR | 2014-0050723 | 4/2014 |
| WO | 2005/076544 | 8/2005 |
| WO | 2007/127942 | 11/2007 |
| WO | 2010-001570 | 1/2010 |
| WO | 2010/035157 | 4/2010 |
| WO | 2013/025636 | 2/2013 |
| WO | 2013/134259 | 9/2013 |

OTHER PUBLICATIONS

Bontu et al., "DRX Mechanism for Power Sharing in LTE," Topics in Radio Communications, IEEE Communications Magazine, pp. 48-55 (Jun. 2009).
Cheong, "TGah Functional Requirements and Evaluation Methodology Rev. 5," IEEE P802.11 Wireless LANs, IEEE 802.11-09/00000905r5 (Jan. 2012).
Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHz, IEEE P802.11ac/D1.4 (Nov. 2011).
Gong et al., "11ah Channelization of China," IEEE 802.11-11/1320r0 (Sep. 2011).
IEEE Standard for Information Technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 11, 2009).
IEEE Standard for Information Technology—Telecommunications and information exchange between systems—Local and metropolitan area networks—Specific requirements; Part 11: Wireless LAN Medium Access Control (MAC) and Physical Layer (PHY) Specifications; IEEE Draft P802.11-REVmb/D12 (Nov. 2011).
Jin et al., "MAC Considerations for 802.11ah (Probe and Pull Mac)," IEEE 11-11/1512r0 (Nov. 2011).
Liu et al., "DCF Enhancements for Large Number of STAs," IEEE 802.11-11/1255r0 (Sep. 2011).
Pantelidou et al., "Power Saving Possibilities for Networks Supporting a Large Number of STAs," IEEE 802.11-12/0028r0 (Jan. 2012).

(56) References Cited

OTHER PUBLICATIONS

Park, "Proposed Specification Framework for TGah," IEEE P802.11 Wireless LANs, IEEE 802.11-11/1137r5 (Jan. 2012).
Park, "Proposed Specification Framework for TGah," IEEE P802.11 Wireless LANs, IEEE 802.11-11/1137r6 (Mar. 2012).
Wang et al., "Supporting Large Number of STAs in 802.11ah," IEEE 802.11-11/1019r1 (Jul. 20, 2011).
Wikipedia, "Distributed coordination function", httQ://en.INikiQedia.org/wiki/Distributed_coordinated_function, © 2012, accessed Sep. 4, 2015, 1 page.
Zheng, "IEEE802.16 Standard Key Technology and Networking Application of WiMAX," China Mobile Group Design Institute Co., Ltd. (May 2008).

\* cited by examiner

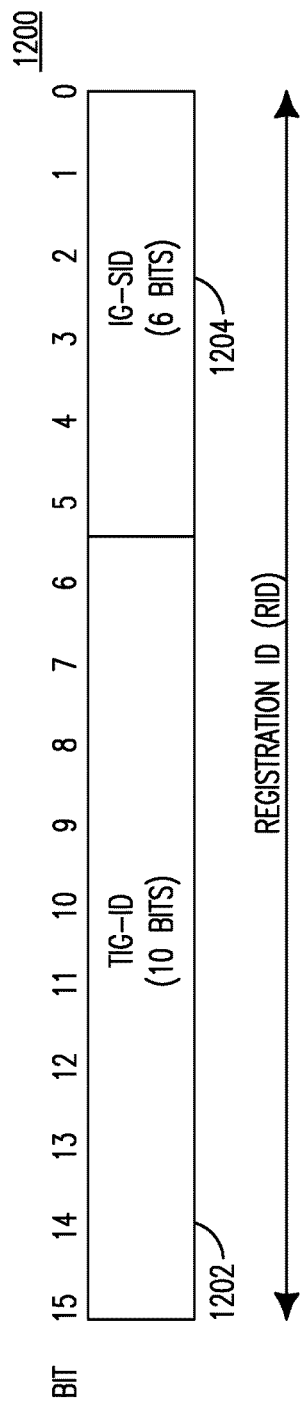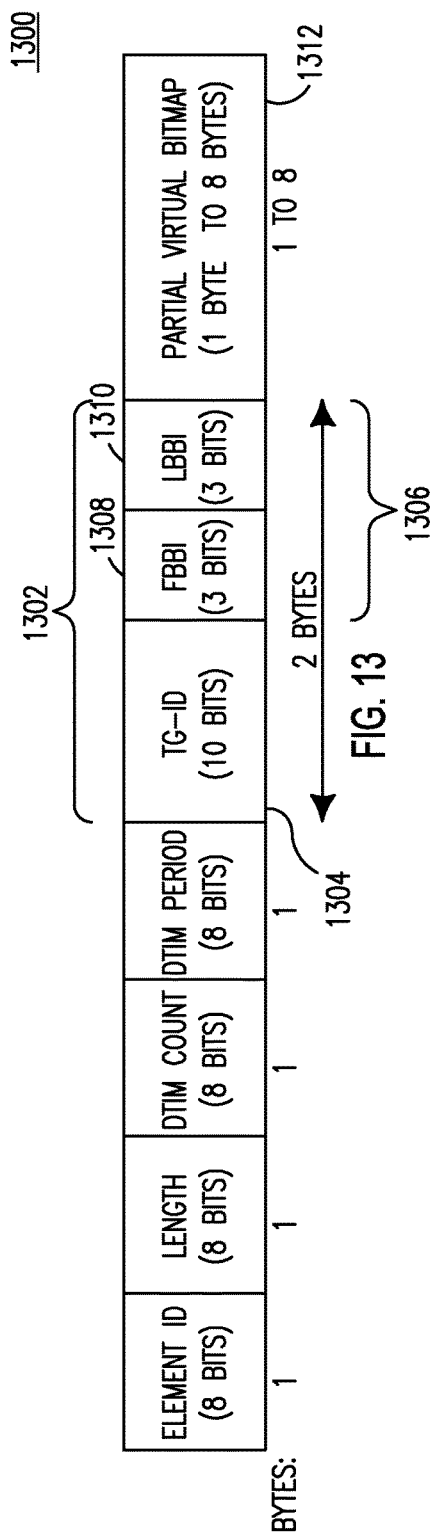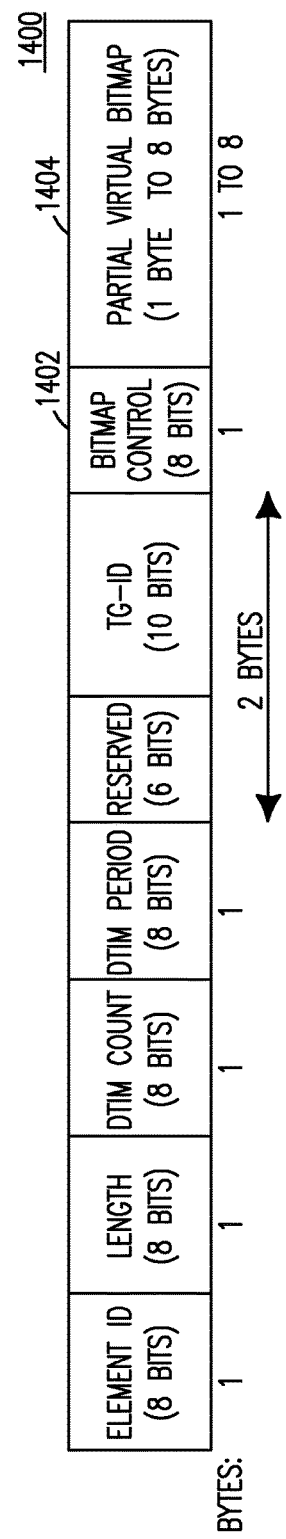

SUPPORTING A LARGE NUMBER OF DEVICES IN WIRELESS COMMUNICATIONS

CROSS REFERENCE TO RELATED APPLICATIONS

This application is a continuation of U.S. patent application Ser. No. 17/993,187, filed Nov. 23, 2022, which is a continuation of U.S. patent application Ser. No. 16/854,588, filed Apr. 21, 2020, which issued Nov. 29, 2022 as U.S. Pat. No. 11,516,701, which is a continuation of U.S. patent application Ser. No. 15/850,841, filed Dec. 21, 2017, which issued May 26, 2020 as U.S. Pat. No. 10,667,169, which is a continuation of U.S. patent application Ser. No. 13/785,842, filed Mar. 5, 2013, which issued Dec. 26, 2017 as U.S. Pat. No. 9,854,469, which claims the benefit of U.S. Provisional Patent Application No. 61/607,354, filed Mar. 6, 2012, U.S. Provisional Patent Application No. 61/669,274, filed Jul. 9, 2012, and U.S. Provisional Patent Application No. 61/696,607, filed Sep. 4, 2012, the entire contents of which are hereby incorporated by reference as if fully set forth herein.

BACKGROUND

A wireless local area network (WLAN) in infrastructure basic service set (BSS) mode has an Access Point (AP) for the BSS and one or more stations (STAs) associated with the AP. The AP typically has access to or interfaces with a distribution system (DS) or another type of wired/wireless network that carries traffic in and out of the BSS. Traffic to the STAs that originates from outside the BSS arrives through the AP and is delivered to the STAs. Traffic originating from the STAs to destinations outside the BSS is sent to the AP to be delivered to the respective destinations. Traffic between STAs within the BSS may also be sent through the AP where the source STA sends traffic to the AP and the AP delivers the traffic to the destination STA. Such traffic between STAs within a BSS is really peer-to-peer traffic. Such peer-to-peer traffic may also be sent directly between the source and destination STAs with direct link setup (DLS) using an 802.11e DLS or an 802.11z tunneled DLS (TDLS). A WLAN in Independent BSS mode has no AP, and STAs communicate directly with each other.

Enhanced distributed channel access (EDCA) is an extension of the basic Distributed Coordination Function (DCF) introduced in 802.11 to support prioritized Quality of Service (QoS). The operation of EDCA in 802.11n is shown in FIG. 1.

The point coordination function (PCF) uses contention-free channel access, and includes the following properties: supports time-bounded services; polling by the AP; the AP sends a polling message after waiting for a PCF interframe space (PIFS); if a client has nothing to transmit, it returns a null data frame; since the PIFS is smaller than a DCF interframe space (DIFS), it can lock out all asynchronous traffic; it is deterministic and fair; and it is efficient for both low duty-cycle and heavy/bursty traffic.

The hybrid coordination function (HCF) controlled channel access (HCCA) is an enhancement of PCF. The AP can poll a STA during both a contention period (CP) and a contention-free period (CFP), and may transmit multiple frames under one poll.

The traffic indicator message (TIM)-based power saving mechanism may be used in 802.11. Basic power management modes are defined and include Awake and Doze states. The AP is aware of the current power saving modes used by STAs it is addressing and buffers the traffic status for STAs that are in a sleep, or Doze state. The AP notifies corresponding STAs using the TIM/delivery traffic indication messages (DTIM) in beacon frames. The STA, which is addressed by the AP, may achieve power savings by entering into the Doze state, and waking up to listen for beacons to receive the TIM to check if the AP has buffered traffic for it to receive. The STA may send a power saving (PS)-Poll control frame to retrieve buffered frames from the AP. The STAs may use a random back-off algorithm before transmitting the PS-Poll frames if and when multiple STAs have buffered frames waiting for reception from the AP.

An example of the TIM and DTIM operation is shown in FIG. 2. The TIM is indicated using an association identifier (AID) bitmap or a partial virtual bitmap. The STAs that currently have buffered bufferable units (BUs) within the AP are identified in a TIM, which is included as an element in all beacon frames generated by the AP. A STA determines that a BU is buffered for it by receiving and interpreting the TIM.

In a BSS operating under the DCF or during the CP of a BSS using the PCF, upon determining that a BU is currently buffered in the AP, a STA operating in the PS mode transmits a short PS-Poll frame to the AP. The AP responds with the corresponding buffered BU immediately, or acknowledges the PS-Poll and responds with the corresponding BU at a later time. If the TIM indicating the buffered BU is sent during a CFP, a CF-Pollable STA operating in the PS mode does not send a PS-Poll frame, but remains active until the buffered BU is received or the CFP ends.

At every beacon interval, the AP assembles the partial virtual bitmap containing the buffer status per destination for STAs in the PS mode and sends the bitmap in the TIM field of the beacon frame. At every beacon interval, the automatic power-save delivery (APSD)-capable AP assembles the partial virtual bitmap containing the buffer status of non-delivery-enabled access categories (ACs) (if there exist at least one non-delivery-enabled AC) per destination for STAs in the PS mode and sends the bitmap in the TIM field of the beacon frame. When all ACs are delivery-enabled, the APSD-capable AP assembles the partial virtual bitmap containing the buffer status for all ACs per destination. If flexible multicast service (FMS) is enabled, the AP includes the FMS descriptor element in every beacon frame. The FMS descriptor element indicates all FMS group addressed frames that the AP buffers.

The maximum length of an information element in the current 802.11 standards is 256 bytes, which is determined by the one-byte length field in the element format. Consequently, this maximum Information Element (IE) size limits the number of STAs that can be supported in the TIM IE, as the TIM uses the bitmap to signal the STAs with buffered downlink (DL) BUs by mapping the STA's AIDs to the bits in the bitmap. In addition to the bitmap field, the TIM element also contains other information fields, for example, DTIM Count, DTIM Period, and Bitmap Control. Therefore, the maximum size of the bitmap field in the TIM element is further limited to 251 bytes.

For the current maximum of 2007 AIDs, the full bitmap needs 2007 bits (251 bytes), which is the maximum size of the bitmap field in the TIM. Therefore, the current TIM with its bitmap structure cannot support more than 2007 STAs. The length of the TIM element increases as the number of supported STAs increases, based on the current TIM element structure as specified in the 802.11 standards. For example, with a maximum of 2007 STAs, the worst case bitmap in the TIM element is 251 bytes. If the maximum number of STAs is increased to a larger number, for example, 6000, then the worst case bitmap would be 6000/8=750 bytes. Such a large size TIM increases the overhead of the TIM/beacon transmission and likely takes it out of the acceptable level, particularly in systems where the channel bandwidth, for example, 1 MHz, 2 MHz, up to 8 MHz, is smaller than other systems.

The following provides an example of analyzing the TIM/beacon overhead in an 802.11ah system, by assuming that a typical beacon has a size of 230 bytes and a transmission rate of 100 Kbps. If a typical beacon frame contains a 30-byte TIM element out of a 230-byte beacon frame, it implies that there are 200 bytes of non-TIM content in a beacon frame.

Considering that a typical bitmap may be smaller than the worst case, it is assumed that the typical size of a TIM bitmap is one-third of the worst case, i.e., 250 bytes for 6000 STAs, which results in a 255-byte TIM element. The beacon frame would be 200+255=455 bytes, counting 200 bytes of non-TIM content. If the beacon is transmitted at the rate of 100 Kbps, the 455-byte beacon frame will take at least 455×8/100=36.4 ms to transmit. Since the beacon interval is typically set up to be 100 ms, beacon frame overhead is 36.4%, which does not include the time used for channel access and inter-frame spacing. For the worst case scenario in which the TIM size is 755 bytes, the beacon frame would be 200+755=955 bytes, corresponding to a 76.40 ms transmission time, or 76.4% of a 100-ms beacon interval.

The Power-Save Multi-Poll (PSMP) mechanism is introduced in 802.11n and has the following features. It may use a single PSMP frame to schedule multiple STAs instead of the direct QoS (+) CF-Poll used in HCCA. The scheduling is more efficient under the scenario where the STAs periodically transmit a small amount of data. It may reduce power consumption by providing an uplink (UL) and a DL schedule at the start of the PSMP phase, so that each STA may shut down their receivers until needed in the DL phase and transmit when scheduled during the UL phase without performing clear channel assessment (CCA). An example of PSMP operation of three STAs is shown in FIG. 3.

SUMMARY

A method for receiving a backoff value at a wireless station is presented. A traffic indication map is received at the station, wherein a backoff number is implicitly assigned to the station based on a position of the station within the traffic indication map. The backoff value is determined by multiplying the backoff number by a predetermined time value.

A wireless station includes a transceiver and a processor. The transceiver is configured to receive a traffic indication map, wherein a backoff number is implicitly assigned to the station based on a position of the station within the traffic indication map. The processor is in communication with the transceiver, and is configured to determine a backoff value for the station by multiplying the backoff number by a predetermined time value.

A method for assigning a backoff value to a wireless station is presented. A traffic indication map is sent to the station, wherein a backoff number is implicitly assigned to the station based on a position of the station within the traffic indication map. The backoff value is determined by multiplying the backoff number by a predetermined time value.

A method for receiving a backoff value at a wireless station is presented. A traffic indication map is received at the station. On a condition that the traffic indication map contains a positive traffic indication for the station, a hash function with a predetermined set of parameters is used to determine the backoff value for the station.

A wireless station includes a transceiver and a processor. The transceiver is configured to receive a traffic indication map. The processor is in communication with the transceiver, and is configured to use a hash function with a predetermined set of parameters to determine a backoff value for the station on a condition that the traffic indication map contains a positive traffic indication for the station.

A method for assigning a backoff value to a wireless station is presented. A traffic indication map is sent to the station. On a condition that the traffic indication map contains a positive traffic indication for the station, a hash function with a predetermined set of parameters is used to determine the backoff value for the station.

BRIEF DESCRIPTION OF THE DRAWINGS

A more detailed understanding may be had from the following description, given by way of example in conjunction with the accompanying drawings, wherein:

FIG. 12 is a diagram of a registration ID (RID) format;

FIG. 13 is a diagram of a RID-based TIM element format; and

FIG. 14 is a diagram of an alternate RID-based TIM element format.

DETAILED DESCRIPTION

Figure 1:
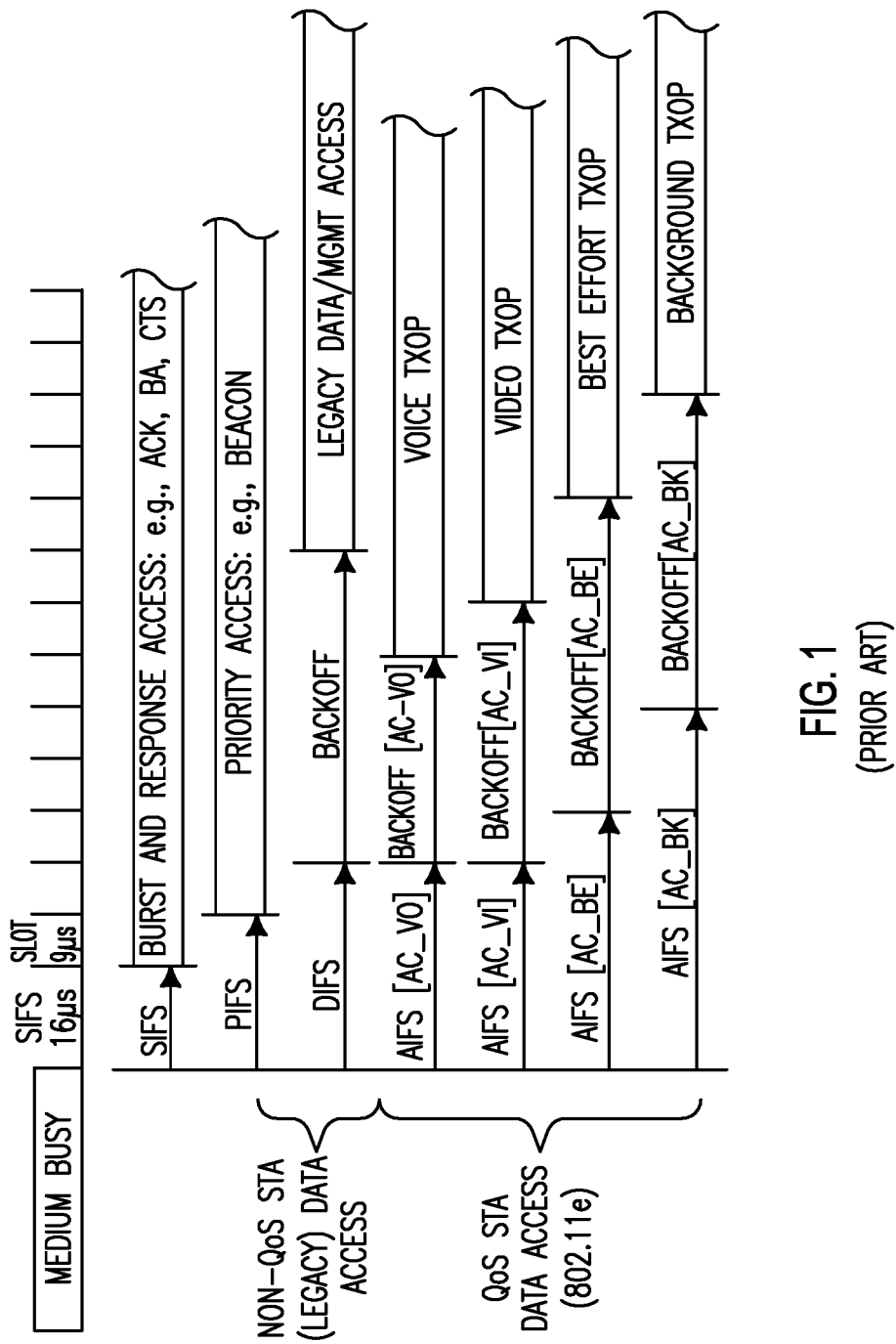
FIG. 1 is a diagram of EDCA operation.
Figure 2:
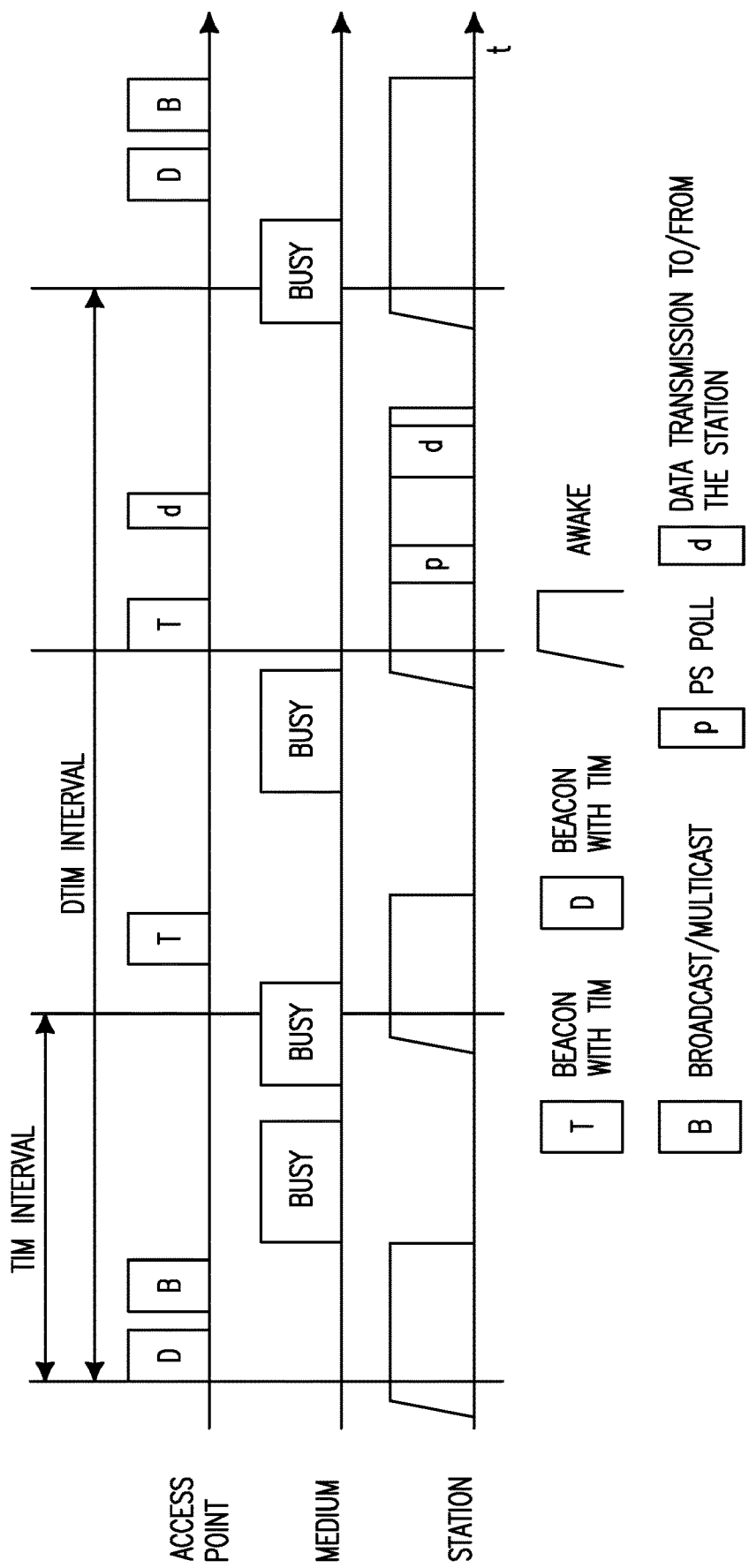
FIG. 2 is an example of TIM and DTIM operation.
Figure 3:
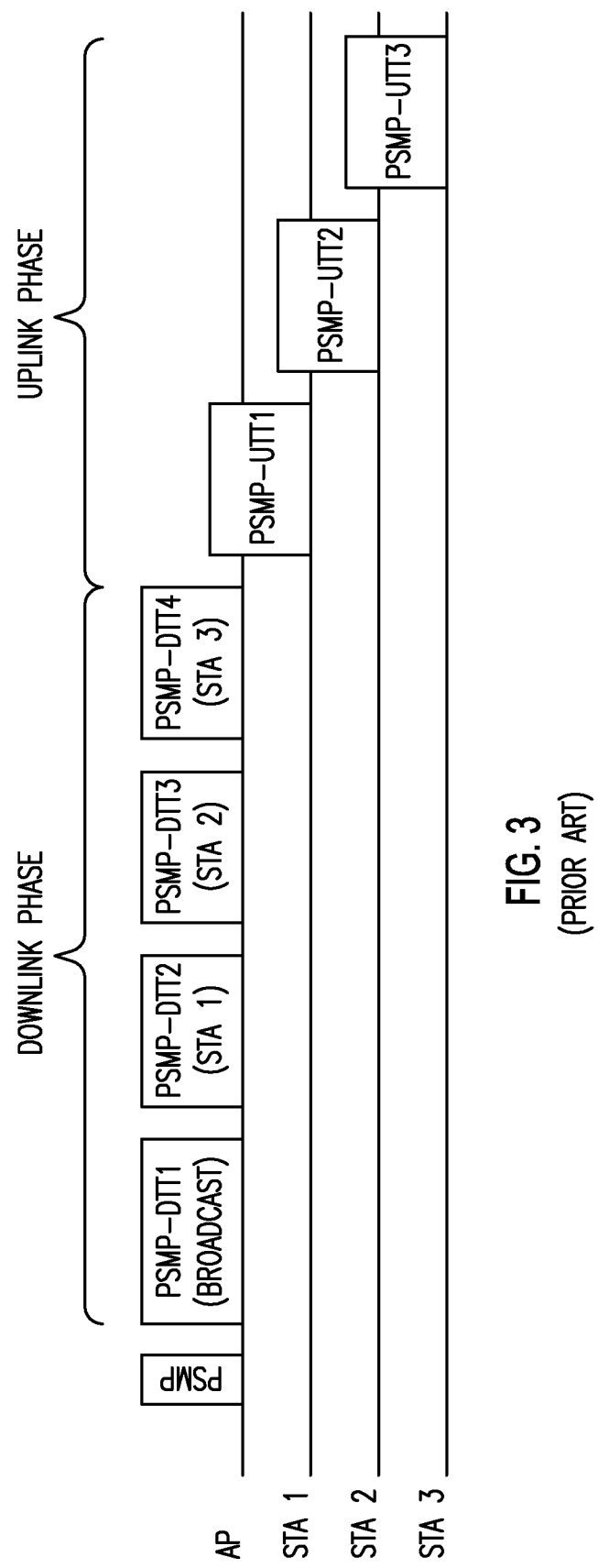
FIG. 3 is an example of PSMP operation of three STAs.
Figure 4A:
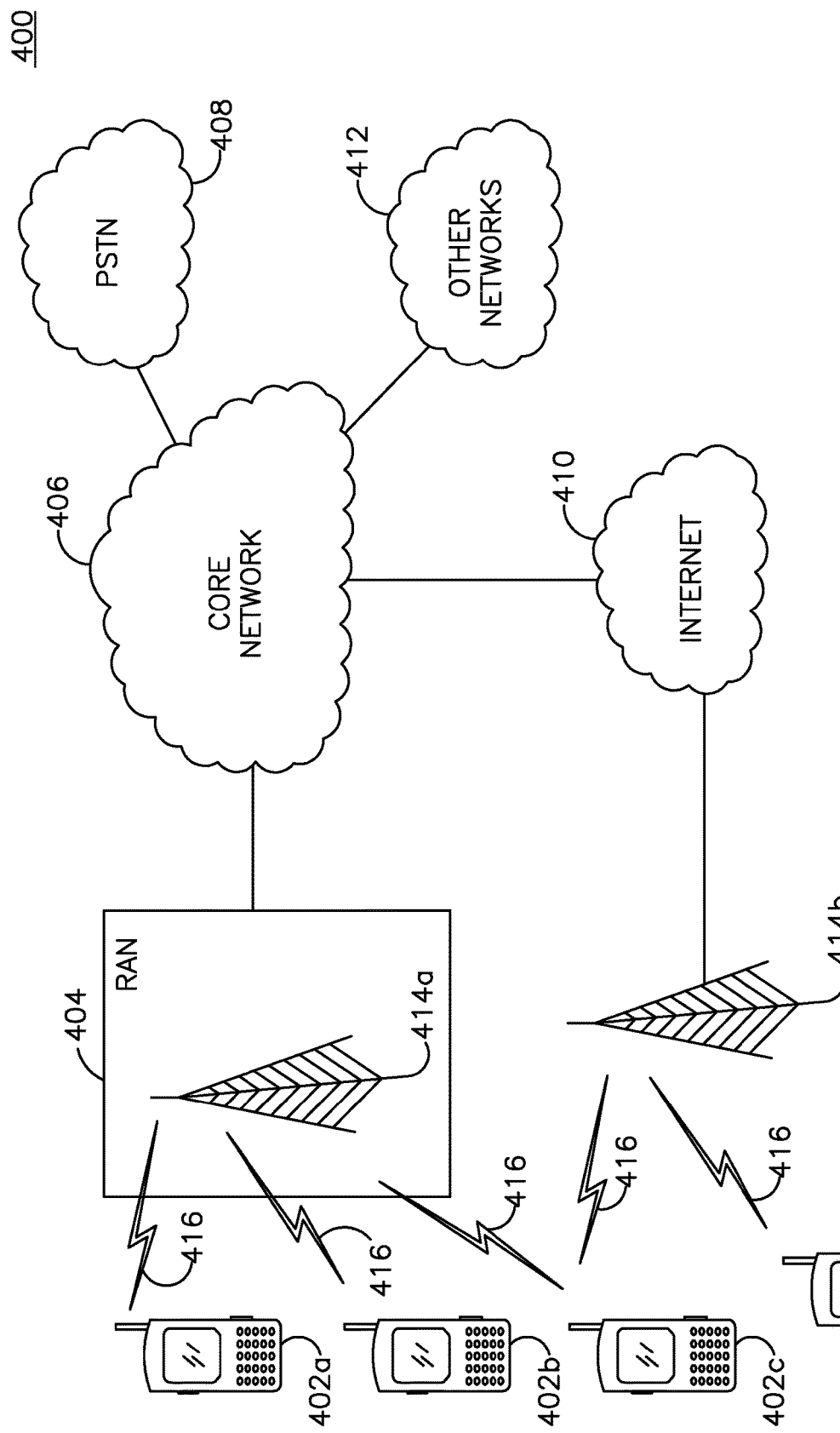
FIG. 4A is a system diagram of an example communications system in which one or more disclosed embodiments may be implemented.

FIG. 4A is a diagram of an example communications system 400 in which one or more disclosed embodiments may be implemented. The communications system 400 may be a multiple access system that provides content, such as voice, data, video, messaging, broadcast, etc., to multiple wireless users. The communications system 400 may enable multiple wireless users to access such content through the sharing of system resources, including wireless bandwidth. For example, the communications systems 400 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 4A, the communications system 400 may include wireless transmit/receive units (WTRUs) 402a, 402b, 402c, 402d, a radio access network (RAN) 404, a core network 406, a public switched telephone network (PSTN) 408, the Internet 410, and other networks 412, though it will be appreciated that the disclosed embodiments contemplate any number of WTRUs, base stations, networks, and/or network elements. Each of the WTRUs 402a, 402b, 402c, 402d may be any type of device configured to operate and/or communicate in a wireless environment. By way of example, the WTRUs 402a, 402b, 402c, 402d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 400 may also include a base station 414a and a base station 414b. Each of the base stations 414a, 414b may be any type of device configured to wirelessly interface with at least one of the WTRUs 402a, 402b, 402c, 402d to facilitate access to one or more communication networks, such as the core network 406, the Internet 410, and/or the networks 412. By way of example, the base stations 414a, 414b may be a base transceiver station (BTS), a Node-B, an eNode B, a Home Node B, a Home eNode B, a site controller, an access point (AP), a wireless router, and the like. While the base stations 414a, 414b are each depicted as a single element, it will be appreciated that the base stations 414a, 414b may include any number of interconnected base stations and/or network elements.

The base station 414a may be part of the RAN 404, which may also include other base stations and/or network elements (not shown), such as a base station controller (BSC), a radio network controller (RNC), relay nodes, etc. The base station 414a and/or the base station 414b may be configured to transmit and/or receive wireless signals within a particular geographic region, which may be referred to as a cell (not shown). The cell may further be divided into cell sectors. For example, the cell associated with the base station 414a may be divided into three sectors. Thus, in one embodiment, the base station 414a may include three transceivers, i.e., one for each sector of the cell. In another embodiment, the base station 414a may employ multiple-input multiple output (MIMO) technology and, therefore, may utilize multiple transceivers for each sector of the cell.

The base stations 414a, 414b may communicate with one or more of the WTRUs 402a, 402b, 402c, 402d over an air interface 416, which may be any suitable wireless communication link (e.g., radio frequency (RF), microwave, infrared (IR), ultraviolet (UV), visible light, etc.). The air interface 416 may be established using any suitable radio access technology (RAT).

More specifically, as noted above, the communications system 400 may be a multiple access system and may employ one or more channel access schemes, such as CDMA, TDMA, FDMA, OFDMA, SC-FDMA, and the like. For example, the base station 414a in the RAN 404 and the WTRUs 402a, 402b, 402c may implement a radio technology such as Universal Mobile Telecommunications System (UMTS) Terrestrial Radio Access (UTRA), which may establish the air interface 416 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 414a and the WTRUs 402a, 402b, 402c may implement a radio technology such as Evolved UMTS Terrestrial Radio Access (E-UTRA), which may establish the air interface 416 using Long Term Evolution (LTE) and/or LTE-Advanced (LTE-A).

In other embodiments, the base station 414a and the WTRUs 402a, 402b, 402c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 414b in FIG. 4A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 414b and the WTRUs 402c, 402d may implement a radio technology such as IEEE 802.11 to establish a wireless local area network (WLAN). In another embodiment, the base station 414b and the WTRUs 402c, 402d may implement a radio technology such as IEEE 802.15 to establish a wireless personal area network (WPAN). In yet another embodiment, the base station 414b and the WTRUs 402c, 402d may utilize a cellular-based RAT (e.g., WCDMA, CDMA2000, GSM, LTE, LTE-A, etc.) to establish a picocell or femtocell. As shown in FIG. 4A, the base station 414b may have a direct connection to the Internet 410. Thus, the base station 414b may not be required to access the Internet 410 via the core network 406.

The RAN 404 may be in communication with the core network 406, which may be any type of network configured to provide voice, data, applications, and/or voice over internet protocol (VoIP) services to one or more of the WTRUs 402a, 402b, 402c, 402d. For example, the core network 406 may provide call control, billing services, mobile location-based services, pre-paid calling, Internet connectivity, video distribution, etc., and/or perform high-level security functions, such as user authentication. Although not shown in FIG. 4A, it will be appreciated that the RAN 404 and/or the core network 406 may be in direct or indirect communication with other RANs that employ the same RAT as the RAN 404 or a different RAT. For example, in addition to being connected to the RAN 404, which may be utilizing an E-UTRA radio technology, the core network 406 may also be in communication with another RAN (not shown) employing a GSM radio technology.

The core network 406 may also serve as a gateway for the WTRUs 402a, 402b, 402c, 402d to access the PSTN 408, the Internet 410, and/or other networks 412. The PSTN 408 may include circuit-switched telephone networks that provide plain old telephone service (POTS). The Internet 410 may include a global system of interconnected computer networks and devices that use common communication protocols, such as the transmission control protocol (TCP), user datagram protocol (UDP) and the internet protocol (IP) in the TCP/IP internet protocol suite. The networks 412 may include wired or wireless communications networks owned and/or operated by other service providers. For example, the networks 412 may include another core network connected to one or more RANs, which may employ the same RAT as the RAN 404 or a different RAT.

Some or all of the WTRUs 402a, 402b, 402c, 402d in the communications system 400 may include multi-mode capabilities, i.e., the WTRUs 402a, 402b, 402c, 402d may include multiple transceivers for communicating with different wireless networks over different wireless links. For example, the WTRU 402c shown in FIG. 4A may be configured to communicate with the base station 414a, which may employ a cellular-based radio technology, and with the base station 414b, which may employ an IEEE 802 radio technology.

Figure 4B:
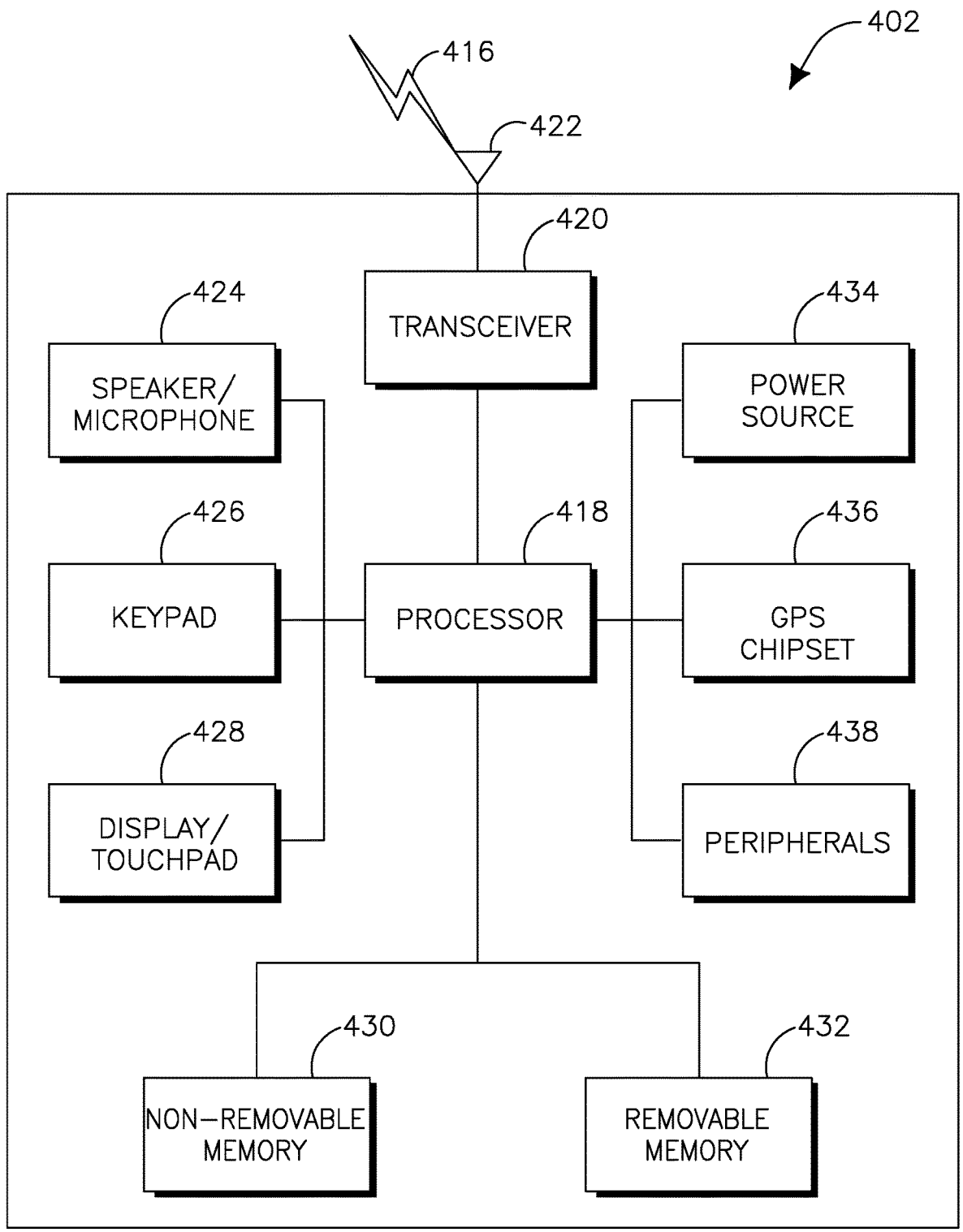
FIG. 4B is a system diagram of an example wireless transmit/receive unit (WTRU) that may be used within the communications system illustrated in FIG. 4A.

FIG. 4B is a system diagram of an example WTRU 402. As shown in FIG. 4B, the WTRU 402 may include a processor 418, a transceiver 420, a transmit/receive element 422, a speaker/microphone 424, a keypad 426, a display/touchpad 428, non-removable memory 430, removable memory 432, a power source 434, a global positioning system (GPS) chipset 436, and other peripherals 438. It will be appreciated that the WTRU 402 may include any subcombination of the foregoing elements while remaining consistent with an embodiment.

The processor 418 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 418 may perform signal coding, data processing, power control, input/output processing, and/or any other functionality that enables the WTRU 402 to operate in a wireless environment. The processor 418 may be coupled to the transceiver 420, which may be coupled to the transmit/receive element 422. While FIG. 4B depicts the processor 418 and the transceiver 420 as separate components, it will be appreciated that the processor 418 and the transceiver 420 may be integrated together in an electronic package or chip.

The transmit/receive element 422 may be configured to transmit signals to, or receive signals from, a base station (e.g., the base station 414a) over the air interface 416. For example, in one embodiment, the transmit/receive element 422 may be an antenna configured to transmit and/or receive RF signals. In another embodiment, the transmit/receive element 422 may be an emitter/detector configured to transmit and/or receive IR, UV, or visible light signals, for example. In yet another embodiment, the transmit/receive element 422 may be configured to transmit and receive both RF and light signals. It will be appreciated that the transmit/receive element 422 may be configured to transmit and/or receive any combination of wireless signals.

In addition, although the transmit/receive element 422 is depicted in FIG. 4B as a single element, the WTRU 402 may include any number of transmit/receive elements 422. More specifically, the WTRU 402 may employ MIMO technology. Thus, in one embodiment, the WTRU 402 may include two or more transmit/receive elements 422 (e.g., multiple antennas) for transmitting and receiving wireless signals over the air interface 416.

The transceiver 420 may be configured to modulate the signals that are to be transmitted by the transmit/receive element 422 and to demodulate the signals that are received by the transmit/receive element 422. As noted above, the WTRU 402 may have multi-mode capabilities. Thus, the transceiver 420 may include multiple transceivers for enabling the WTRU 402 to communicate via multiple RATs, such as UTRA and IEEE 802.11, for example.

The processor 418 of the WTRU 402 may be coupled to, and may receive user input data from, the speaker/microphone 424, the keypad 426, and/or the display/touchpad 428 (e.g., a liquid crystal display (LCD) display unit or organic light-emitting diode (OLED) display unit). The processor 418 may also output user data to the speaker/microphone 424, the keypad 426, and/or the display/touchpad 428. In addition, the processor 418 may access information from, and store data in, any type of suitable memory, such as the non-removable memory 430 and/or the removable memory 432. The non-removable memory 430 may include random-access memory (RAM), read-only memory (ROM), a hard disk, or any other type of memory storage device. The removable memory 432 may include a subscriber identity module (SIM) card, a memory stick, a secure digital (SD) memory card, and the like. In other embodiments, the processor 418 may access information from, and store data in, memory that is not physically located on the WTRU 402, such as on a server or a home computer (not shown).

The processor 418 may receive power from the power source 434, and may be configured to distribute and/or control the power to the other components in the WTRU 402. The power source 434 may be any suitable device for powering the WTRU 402. For example, the power source 434 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 418 may also be coupled to the GPS chipset 436, which may be configured to provide location information (e.g., longitude and latitude) regarding the current location of the WTRU 402. In addition to, or in lieu of, the information from the GPS chipset 436, the WTRU 402 may receive location information over the air interface 416 from a base station (e.g., base stations 414a, 414b) and/or determine its location based on the timing of the signals being received from two or more nearby base stations. It will be appreciated that the WTRU 402 may acquire location information by way of any suitable location-determination method while remaining consistent with an embodiment.

The processor 418 may further be coupled to other peripherals 438, which may include one or more software and/or hardware modules that provide additional features, functionality and/or wired or wireless connectivity. For example, the peripherals 438 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 4C:
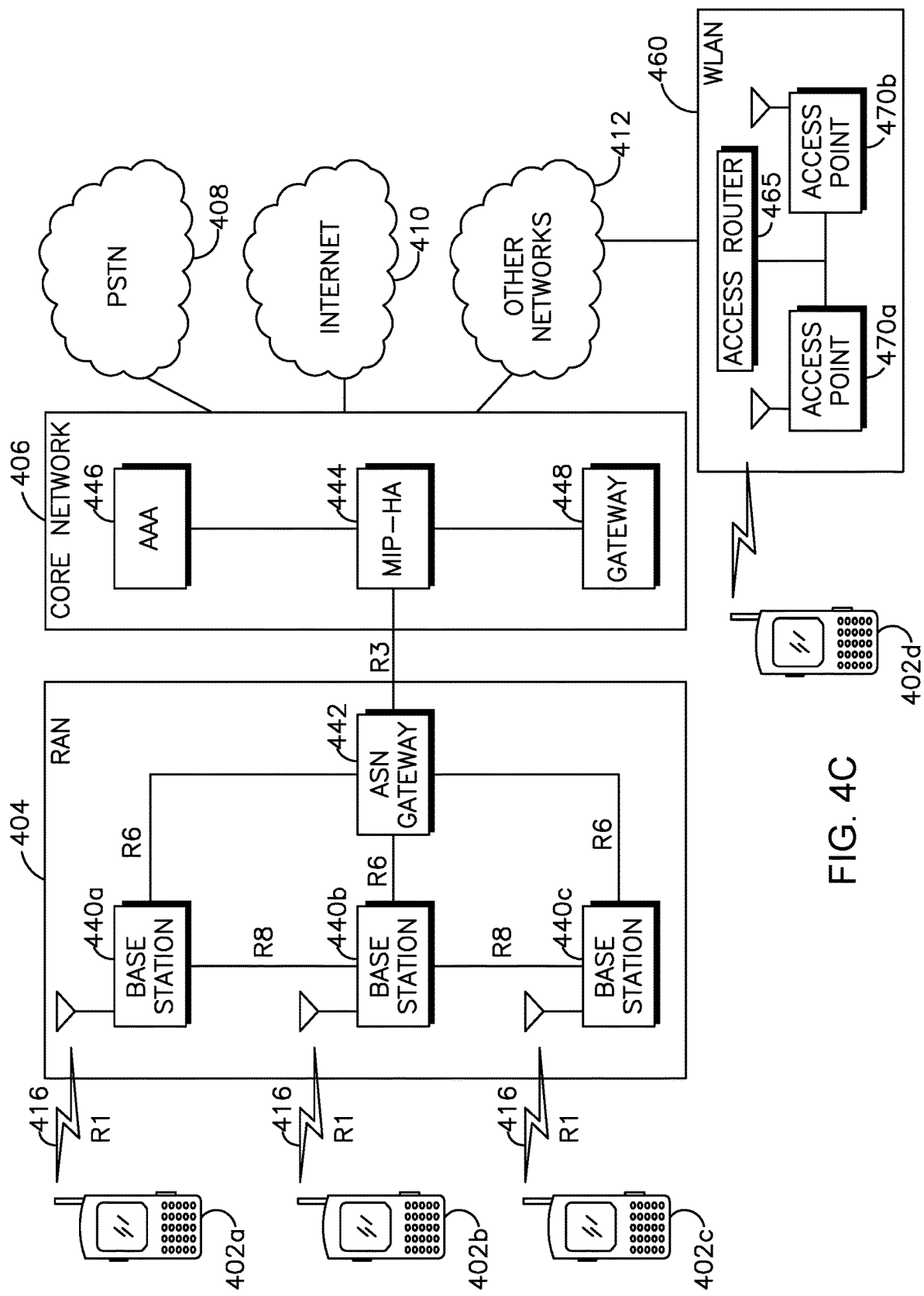
FIG. 4C is a system diagram of an example radio access network and an example core network that may be used within the communications system illustrated in FIG. 4A.

FIG. 4C is a system diagram of the RAN 404 and the core network 406 according to an embodiment. The RAN 404 may be an access service network (ASN) that employs IEEE 802.16 radio technology to communicate with the WTRUs 402a, 402b, 402c over the air interface 416. As will be further discussed below, the communication links between the different functional entities of the WTRUs 402a, 402b, 402c, the RAN 404, and the core network 406 may be defined as reference points.

As shown in FIG. 4C, the RAN 404 may include base stations 440a, 440b, 440c, and an ASN gateway 442, though it will be appreciated that the RAN 404 may include any number of base stations and ASN gateways while remaining consistent with an embodiment. The base stations 440a, 440b, 440c may each be associated with a particular cell (not shown) in the RAN 404 and may each include one or more transceivers for communicating with the WTRUs 402a, 402b, 402c over the air interface 416. In one embodiment, the base stations 440a, 440b, 440c may implement MIMO technology. Thus, the base station 440a, for example, may use multiple antennas to transmit wireless signals to, and receive wireless signals from, the WTRU 402a. The base stations 440a, 440b, 440c may also provide mobility management functions, such as handoff triggering, tunnel establishment, radio resource management, traffic classification, quality of service (QoS) policy enforcement, and the like. The ASN gateway 442 may serve as a traffic aggregation point and may be responsible for paging, caching of subscriber profiles, routing to the core network 406, and the like.

The air interface 416 between the WTRUs 402a, 402b, 402c and the RAN 404 may be defined as an R1 reference point that implements the IEEE 802.16 specification. In addition, each of the WTRUs 402a, 402b, 402c may establish a logical interface (not shown) with the core network 406. The logical interface between the WTRUs 402a, 402b, 402c and the core network 406 may be defined as an R2 reference point, which may be used for authentication, authorization, IP host configuration management, and/or mobility management.

The communication link between each of the base stations 440a, 440b, 440c may be defined as an R8 reference point that includes protocols for facilitating WTRU handovers and the transfer of data between base stations. The communication link between the base stations 440a, 440b, 440c and the ASN gateway 442 may be defined as an R6 reference point. The R6 reference point may include protocols for facilitating mobility management based on mobility events associated with each of the WTRUs 402a, 402b, 402c.

As shown in FIG. 4C, the RAN 404 may be connected to the core network 406. The communication link between the RAN 404 and the core network 406 may defined as an R3 reference point that includes protocols for facilitating data transfer and mobility management capabilities, for example. The core network 406 may include a mobile IP home agent (MIP-HA) 444, an authentication, authorization, accounting (AM) server 446, and a gateway 448. While each of the foregoing elements are depicted as part of the core network 406, it will be appreciated that any one of these elements may be owned and/or operated by an entity other than the core network operator.

The MIP-HA may be responsible for IP address management, and may enable the WTRUs 402a, 402b, 402c to roam between different ASNs and/or different core networks. The MIP-HA 444 may provide the WTRUs 402a, 402b, 402c with access to packet-switched networks, such as the Internet 410, to facilitate communications between the WTRUs 402a, 402b, 402c and IP-enabled devices. The AAA server 446 may be responsible for user authentication and for supporting user services. The gateway 448 may facilitate interworking with other networks. For example, the gateway 448 may provide the WTRUs 402a, 402b, 402c with access to circuit-switched networks, such as the PSTN 408, to facilitate communications between the WTRUs 402a, 402b, 402c and traditional land-line communications devices. In addition, the gateway 448 may provide the WTRUs 402a, 402b, 402c with access to the networks 412, which may include other wired or wireless networks that are owned and/or operated by other service providers.

Although not shown in FIG. 4C, it will be appreciated that the RAN 404 may be connected to other ASNs and the core network 406 may be connected to other core networks. The communication link between the RAN 404 the other ASNs may be defined as an R4 reference point, which may include protocols for coordinating the mobility of the WTRUs 402a, 402b, 402c between the RAN 404 and the other ASNs. The communication link between the core network 406 and the other core networks may be defined as an R5 reference, which may include protocols for facilitating interworking between home core networks and visited core networks.

Other networks 412 may further be connected to an IEEE 802.11 based wireless local area network (WLAN) 460. The WLAN 460 may include an access router 465. The access router may contain gateway functionality. The access router 465 may be in communication with a plurality of access points (APs) 470a, 470b. The communication between access router 465 and APs 470a, 470b may be via wired Ethernet (IEEE 802.3 standards), or any type of wireless communication protocol. AP 470a is in wireless communication over an air interface with WTRU 402d.

With the proliferation of personal mobile devices and applications such as meters and sensors, it is expected that future WiFi systems and associated APs will support a large number of devices, which may be much more than the current limit of 2007 devices per BSS. The 802.11ah standard, for example, proposes supporting up to 6000 devices per BSS.

Channels allocated in the wireless spectrum may be limited in size and bandwidth. In addition, the spectrum may be fragmented in that available channels may not be adjacent to each other, and it may not be possible to combine and support larger transmission bandwidths. Such is the case, for example, in spectrum allocated below 1 GHz in various countries. WLAN systems, for example built on the 802.11 standard, may be designed to operate in such spectrum. Given the limitations of such spectrum, the WLAN systems support smaller bandwidths and lower data rates compared to high throughput (HT)/very high throughput (VHT) WLAN systems, for example, based on the 802.11n/ 802.11ac standards.

The spectrum allocation in some countries is limited. For example, in China the 470-566 and 614-787 MHz bands only allow 1 MHz bandwidth. Therefore, there is a need to support a 1 MHz only option, in addition to supporting a 2 MHz option with a 1 MHz mode. The 802.11ah physical layer (PHY) is required to support 1, 2, 4, 8, and 16 MHz bandwidths.

The 802.11ah PHY operates below 1 GHz and is based on the 802.11ac PHY. To accommodate the narrow bandwidths required by 802.11ah, the 802.11ac PHY is down-clocked by a factor of 10. While support for 2, 4, 8, and 16 MHz may be achieved by the 1/10 down-clocking, support for the 1 MHz bandwidth requires a new PHY definition with a Fast Fourier Transform (FFT) size of 32.

DCF performance deteriorates when a large number of STAs contend for channel access. The overall number of medium access control (MAC) retries and the total transmission delay grows exponentially with the number of STAs contending for access. There are many scenarios in which a WLAN system would encounter a large number of STAs simultaneously attempting to access the medium. For example, several key use cases have been defined for IEEE 802.11ah, including meters, sensors, and sensor backhaul. When a WLAN BSS needs to support a very large number of STAs (e.g., 6000 STAs), it is likely that a group of STAs may wake up simultaneously and try to access the medium simultaneously. Such a scenario may occur, for example, when a large number of STAs wake up and receive the TIM transmission in the beacon, short beacon, or other type of frame from the AP, and those STAs with a positive indication of buffered data/traffic contend for the medium to send a PS-Poll frame to the AP.

Furthermore, in 802.11ai, one requirement is to support 100 STAs simultaneously entering a BSS and setting up fast initial link within one second. To compete for access to the medium, each STA conducts a random backoff by selecting a backoff number randomly from the Contention Window (CW). Given that the STAs will have an initial CW size of seven, it is highly probable that packet collisions will take place when there are many more STAs in the WLAN. Since the 802.11 standards prescribe that the CW size doubles each time a transmission is not successful, the collision will likely occur for many rounds, depending on the number of competing STAs. This repeated collision and retransmission process will cause the STAs to use a large amount of energy to deliver any packets, as well as cause large data delays and congestion in the BSS. The issue for WLAN systems with a large number of devices is how to enhance DCF/EDCA to reduce channel contention and packet collisions.

All existing power saving solutions/modes require keeping the dozing/sleeping STA in association with the AP to correctly receive traffic indications in TIMs/DTIMs, as the Association IDs (AIDs) are used in identifying the corresponding traffic indication bits for the STAs in the traffic indication bitmap in TIMs/DTIMs. The maximum number of AIDs in the current dot11 specification is 2007; however, a WiFi system may need to support a much larger number of devices (for example, 802.11ah supports up to 6000 devices). There is a need to support more than 2007 devices with the power saving mode in 802.11ah.

The current TIM transmissions as specified by the 802.11 standards have some performance inefficiency. The current standards specify that the TIM contains the traffic indications for all STAs that have buffered BUs at the AP, regardless of the destination STA's status, i.e., in the active state or the doze/sleep state. For the TIMs to include the traffic indications for STAs in the doze/sleep state wastes resources, resulting in performance inefficiency for the TIM scheme. In particular, when required to support a large number of STAs in 802.11ah, the TIM encoding and transmission efficiency becomes a performance issue.

With DCF or PCF-CFP, for each positive traffic indication in a TIM, the follow-up actions include a sequence of frame transmissions of PS-Poll from the STA to the AP and BU delivery from the AP to the STA or an ACK from the AP to the STA as a response to the PS-Poll. The maximum number of PS-Poll+BU delivery/ACK sequences for a TIM interval is limited by the TIM interval length, beacon frame size, channel bandwidth, sizes of BUs, and rates/modulation coding sets (MCSs) used for BU transmissions. It is inefficient for the TIM to contain more positive traffic indications than the maximum number of PS-Poll+BU-delivery/ACK sequences for each TIM interval. This TIM transmission inefficiency becomes more severe as the channel bandwidth decreases and/or the number of supported STAs increases. The issue for a WiFi system with a large number of devices is how to enhance the TIM protocol to allow for efficient operation.

For a PCF-CFP BU transmission, there is a maximum number of BUs that can be delivered during a TIM interval. If a TIM contains more positive traffic indications than this maximum number, it leads to a potentially larger size TIM element; longer air time occupancy for transmission; and keeping the STAs awake longer, resulting in power consumption inefficiencies. As described above, in 802.11ah, the overhead of the beacon frame with a TIM is 36.4%, not including the time used for channel access and the interframe spacing. For the worst case, the overhead of beacon frame would be 76.4% in a 100-ms beacon interval. Therefore, for a WiFi system with relatively small bandwidth but supporting a large number of devices, an efficient method to signal a positive traffic indication in the TIM is needed.

A large number of devices may be supported and power savings may be achieved through collision reduction by controlled contention. One embodiment aims to provide energy saving mechanisms for a large number of STAs by providing controlled contention to the medium and adapting the contention window (CW) size. In particular, the AP determines the initial CW size depending on the expected load in the BSS. The STAs still use carrier sense multiple access with collision avoidance (CSMA/CA) to contend for the medium, but the random backoff process is modified for both associated STAs and unassociated STAs.

The AP may estimate how many STAs it must support either in its entire BSS or during a specific interval during the BSS operations. An example of such an interval is the interval after a TIM transmission in a beacon, short beacon, or other type of frame, which has a positive indication of buffered data/traffic for a large number of STAs.

The initial CW size should be large enough to accommodate all STAs that are expected to be operating within the interval for which the CW size is valid. The initial CW size should also provide extra space so that any newly arrived STAs may be supported. The initial CW size may be fixed for a BSS or it may vary for different intervals of the BSS operation. For example, each beacon interval may have a different initial CW size depending on the number of STAs expected to operate in that beacon interval. The initial CW size may be of the form of $2^M-1$, where M is an integer and $2^M-1$ may be larger than the number of STAs expected to be operating in that beacon interval(s) or subinterval(s).

For example, up to 40 STAs which function as fire sensors may wake up simultaneously to report that a fire has been detected. At the same time, the AP needs to support 20 other STAs which stay active and operate in the BSS. In addition, the AP could expect to support association request frames from 10 new STAs. The initial CW size then should be larger than or equal to 70, depending on the implementation.

In another example, in a beacon interval, 100 STAs may be assigned to wake up and compete for the medium. Such a situation may occur when a large number of STAs wake up and receive a positive indication of buffered data/traffic in a TIM transmission from the AP, and these STAs contend for the medium to send a PS-Poll frame to the AP. In addition, the AP could expect to support association request frames from 15 new STAs. The initial CW size then should be larger than or equal to 115, depending on the implementation.

Once the initial CW size is determined, it may be announced by the AP as a part of the beacon, short beacon, probe response, association response, Fast Initial Link Setup (FILS) Discovery frame, or other types of management or control frames. The CW size follows the same rule as prescribed in the 802.11 standards, and may be doubled every time a transmission fails. When a transmission is successful, the CW size may revert to a predetermined initial CW size.

The STAs may also be assigned a deterministic initial backoff number by the AP at the time of association or at any other pre-negotiated time. For example, a deterministic initial backoff number/offset may be assigned to STAs by the AP before, after, or along with a TIM transmission. The assignment of a back off number/offset to STAs by the AP may be carried out as a part of the beacon, short beacon, probe response, association response, or other new or existing management or control frames. The assignment of the initial deterministic backoff may be done in one or a combination of the following methods.

Method 1: The initial backoff numbers are sequential. For example, STA 1 to STA 10 are assigned the backoff numbers n+1 . . . n+10 where n is a number from the interval [0, 1, . . . , CW_size−10].

Method 2: The initial backoff numbers are randomly determined. For example, STA 1 to STA 10 are assigned a backoff number selected randomly from the interval [0, 1, . . . , CW_size] with any probability distribution. The selected backoff number should be ensured to be unique for each STA.

Method 3: The initial backoff numbers are randomly determined by a different method. For example, STA1 to STA 10 are assigned the backoff numbers N1, N1+n1, N1+n2, . . . , N1+n9, where n1, n2, . . . , n9 are unique and larger than 0.

Method 4: The AP assigns multiple initial backoff numbers to a STA if the STA has multiple packets to transmit. For example, the AP may assign the backoff numbers [3, 3] to STA X, if STA X would likely be able to transmit twice during the controlled contention interval. In this case, the backoff number 6 (being equal to the backoff numbers [3, 3] assigned to STA X) should not be assigned to any other STA to avoid collisions.

The STAs with the assigned initial backoff number may attempt to access the medium using the initial CW size at a particular time. For example, sensor and meter STAs that are assigned to wake up in a particular beacon interval may access the medium when the beacon interval starts following a previously received beacon. In another example, STAs that wake up and receive a positive indication of buffered data/traffic in a TIM transmission may access the medium following a beacon, short beacon, or other type of frame containing the TIM to send PS-Poll frames to the AP.

There are several classes of STAs. One class is TIM STAs, and if a TIM STA is in the power saving mode, it will wake up at the assigned beacon intervals (according to the STA's sleep schedule) to listen to the TIM. If the TIM indicates that there is Buffered Unit (BU), the STA will retrieve the BU. Another class of STAs will not listen to the beacon or the TIM, but will instead poll the AP for the BU whenever the STA wakes up.

In another example, an AP may indicate the start of a controlled contention period using a control frame, a management frame, or other type of frame, during which the STAs with an assigned initial backoff number may access the medium.

Figure 5:
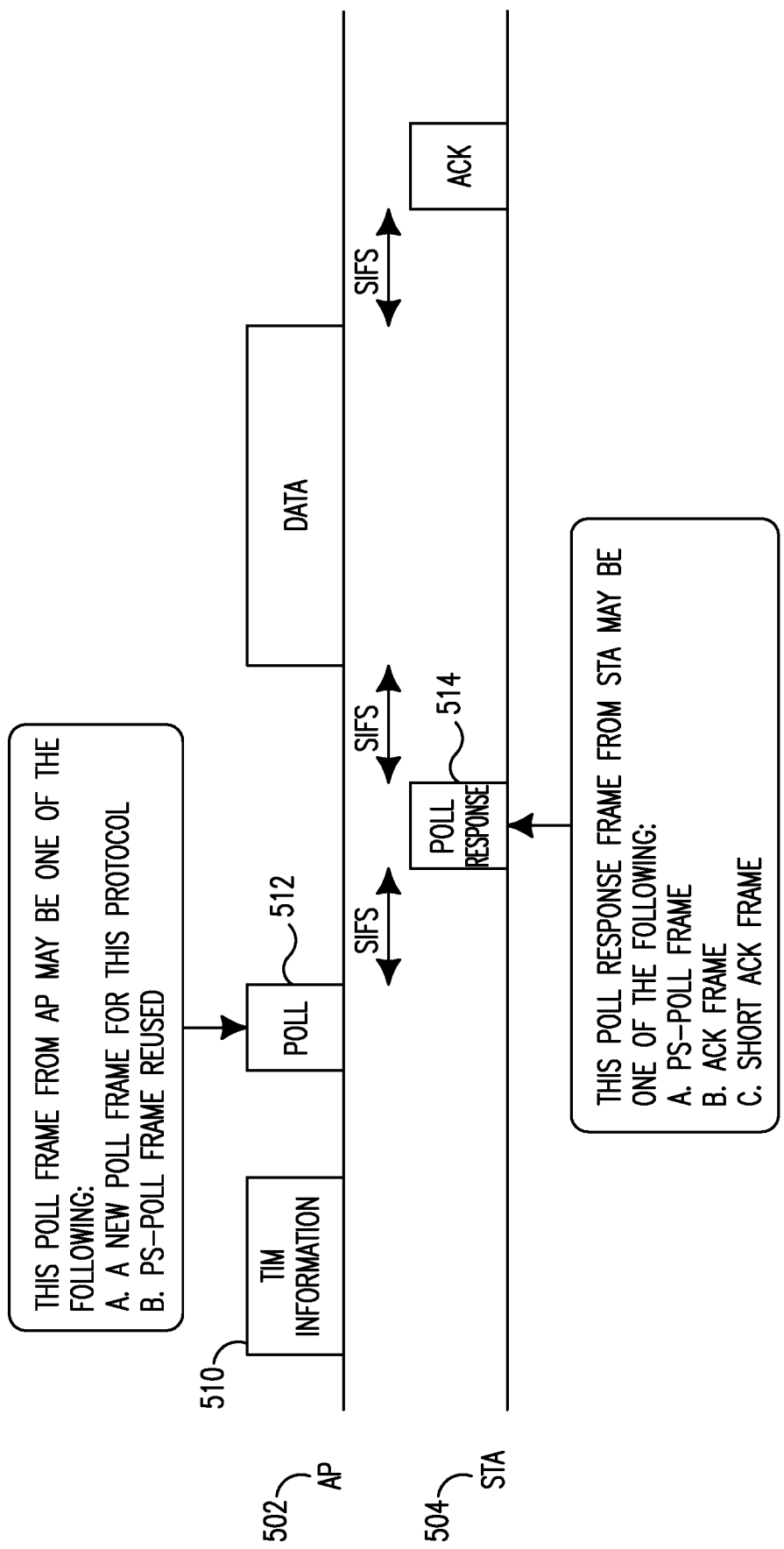
FIG. 5 is an example of an AP polling a STA to send buffered data/traffic.

In one embodiment, shown in FIG. 5, the control frame may be a poll frame. An AP 502 sends TIM information 510 to a STA 504. The AP 502 then sends a poll frame 512 to the STA 504 that had a positive traffic indication in the TIM information 510. The poll frame 512 may be a new poll frame for this protocol or the existing 802.11 PS-Poll frame, reused for this protocol. The format of the new poll frame may be assigned a new control subtype indication in the frame control field, and may include any one or more of: a frame control field with the new subtype indication; an identification for the STA, such as its AID, MAC address, etc.; or a BSSID, which is the address of the STA contained in the AP. In response to the poll frame 512, the STA 504 sends a poll response frame 514 to the AP 502. The poll response frame 514 may be any one of: the existing 802.11 PS-Poll frame, an ACK frame, or a short ACK frame.

In another variation, the AP may send a poll frame to a group of STAs that had positive traffic indications in the TIM. This poll frame may be a new poll frame for this protocol or the existing 802.11 PS-Poll frame, reused for this protocol, but is either broadcast or multicast to a group of users. The new poll frame may be the same as described above. In response to the poll frame from the AP, the group of polled STAs may transmit according to their assigned backoff values. Each polled STA transmits a poll response frame, which may be any one of: the existing 802.11 PS-Poll frame, an ACK frame, or a short ACK frame.

In the cases of the AP polling a single STA and polling a group of STAs, the STAs from which PS-Polls were not received by the AP in the current beacon interval may be treated according to one or more of the following rules.

1. The AP reschedules or reassigns the backoff numbers of those STAs in the next or a subsequent beacon interval.
2. Those STAs receive a higher priority over STAs that receive an indication of buffered data/traffic in one of the next or subsequent beacon intervals.
3. Those STAs maintain their assigned priority relative to STAs that received an indication of buffered data/traffic in the same beacon interval (e.g., by having deterministic backoff offsets that are smaller).

In one embodiment, the AP may adjust the deterministic backoff offset based on the number of positive buffered data/traffic indications in the TIM broadcast. For example, if the number of indications is small, the backoff offsets are smaller because there are fewer STAs competing for medium access. If the number of indications is large, the backoff offsets are larger because there are more STAs competing for medium access and there is a need to reduce collisions or congestion.

The AP may also indicate the start of a normal contention period after the controlled contention period using a schedule IE, field, subfield, or MAC/PLOP headers in a management, control, or other type of frame. A STA may also choose to maintain this initial backoff number in any transmissions and retransmissions following the initial medium access. The STA may also choose to follow the standard channel contention rules using the adaptive initial CW size and any CW size based on the initial CW size.

Alternatively, the backoff number for each STA may be implicitly determined by the order of its TIM indication. For each STA that has a positive indication in the TIM, the backoff number assigned to that STA may be defined by a function of the order of the STA's positive TIM indication. For example, if a STA's positive indication is the $k^{th}$ positive indication in the TIM, then the assigned backoff number for that STA may be f(k). In another variation, the AP may determine sequences of backoff numbers Backoff_Seq(n, t), t≥0. A STA assigned to the $m^{th}$ backoff number sequence may use backoff_number=Backoff_seq(m, L) for the $L^{th}$ time interval, where a time interval may refer to any time interval such as beacon interval, beacon subinterval, wake up time interval, listening interval, a interval that has duration of a second, a millisecond or 100 milliseconds, etc. The assignment of the initial backoff number "m" may implicitly indicate that the STA may use the $m^{th}$ Backoff_seq(m, t) for subsequent channel access. Different backoff number assignments for different channel access intervals may lead to fair power consumption and channel access for STAs.

The assigned initial backoff number/values may also be implemented as a schedule, either dynamic or static. For example, each of the initial backoff numbers/values may have an implicit associated time unit (TU) to comprise an actual backoff time defined as the time that a STA may wait before attempting channel access. The TU may be implemented as a slot time or any other units of time. For example, if the TU is K ms and STA 1 to STA 10 are assigned the backoff numbers n+1 ... n+10, then the actual backoff times of STA1 to STA10 are (n+1)×K, ... (n+10)×K ms, respectively. In the case of a TIM-based DL data retrieval scenario, the sequence of STAs that are assigned backoff numbers is signaled implicitly by the TIM bitmap based on the STA's position within the TIM bitmap. The value of the implicit TU for each STA or each backoff number is either fixed, for example, in the specification, or is signaled as a part of the beacon, short beacon, probe response, association response, FILS Discovery frame, or other new or existing management or control frames.

Another embodiment is to use a hash function with STA-specific and AP/BSS-specific parameters to determine the backoff time for each STA with a positive indication in the TIM. Using the hash function makes the backoff time different across different APs in the overlapping BSS (OBSS) and different for STAs in different beacon intervals, to have some fairness in the DL data retrieval latency across APs. The STA-specific and AP/BSS-specific parameters used to determine the backoff time may be one, or a combination of several parameters, including the following: the BSSID (or the MAC address) of the BSS/AP that transmits the TIM; the AID/MAC address of the STA with a positive TIM indication; the bitmap position within the TIM; the TSF value of the AP with which STA is associated; the OBSS/neighbor AP TSF offset, with respect to the TSF of the AP with which STA is associated; the slot time; or the total number of positive TIM indications of a BSS or OBSS.

For example, the backoff time of each STA i with a positive TIM indication, denoted by TBO(i), may be given by:

$$TBO(i)=\text{Hash}(\text{bitmap position},BSSID,AID,TSF) \quad \text{Equation (1)}$$

In both methods (sequential allocation and hash function), if the calculated backoff time falls into a beacon transmission time or a restricted access window (RAW) that it is not allowed to use, then the calculated backoff time is adjusted accordingly. One way is to postpone the backoff time by the amount of conflicting beacon transmission time (denoted as TBeacon) or not allowed RAW duration (denoted as TRAW):

$$TBO(i)=TBO(i)+\text{TBeacon or } TBO(i)=TBO(i)+\text{TRAW} \quad \text{Equation (2)}$$

In some scenarios, there may be a limit on the maximum backoff time, for example, Tmax. Then TBO(i) is given by:

$$TBO(i)=\max(T\max,\text{Hash}(\text{bitmap position},BSSID,AID,TSF)) \quad \text{Equation (3)}$$

The value of Tmax may be chosen by the AP, considering factors such as the DL data retrieval time window or the beacon interval. For example, if the beacon interval is 500 ms, the AP wants to restrict the backoff time to within one beacon interval, the beacon transmission time is 50 ms, and the time unit (TU) is 20 ms (i.e., K=20). Then, Tmax may be chosen to be 450 ms (500 ms−50 ms) or 430 ms (500 ms−50 ms−20 ms). Or the AP may choose to reserve 250 ms out of the 450 ms for DL data retrieval and UL PS-Poll/trigger frames, then Tmax may be chosen to be 250 ms or 230 ms.

Figure 6:
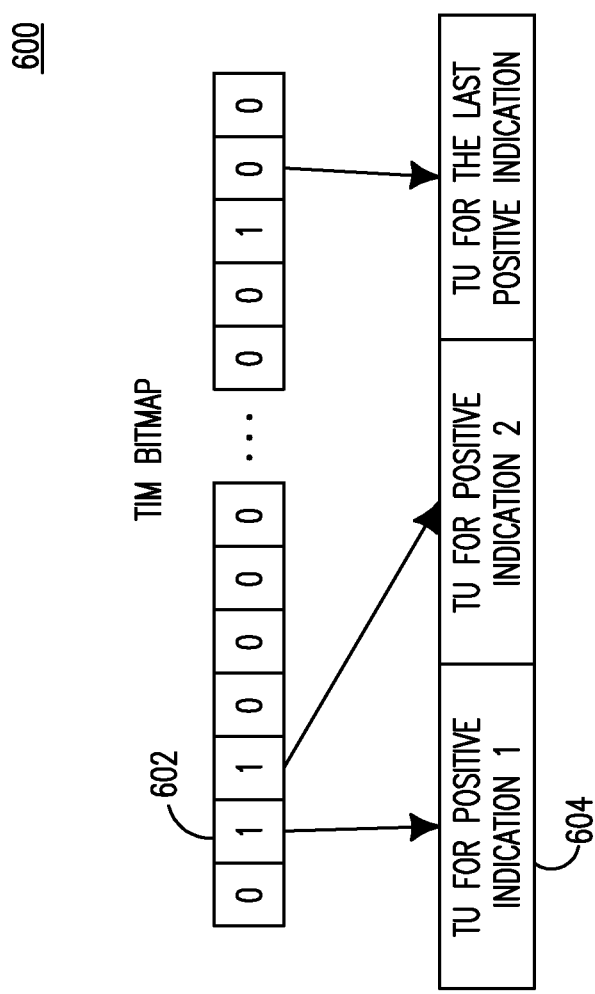
FIG. 6 is a diagram of an example of a dynamic associated time unit (TU) values information element for a TIM.

Alternatively, to enhance efficiency, especially in the case where the STA sends a PS-Poll in the UL to retrieve DL data, a dynamic value of the associated TU may be used for each STA that receives a positive data indication in the TIM. For each positive indication in the TIM, an information field of the associated dynamic TU with M bits is also carried in the same frame, where the TIM is transmitted to represent the dynamic value of the associated TU, or a frame immediately after the frame containing the TIM. As shown in FIG. 6, an implicit one-to-one mapping between the positive indication in the TIM 600 and the associated TU is decided by the order of the positive indication in TIM and the order of the TU fields. For example, a positive indication in a first bit position 602 corresponds to a TU 604 associated with the first bit position.

The actual backoff time may be calculated using the dynamic TU values for each STA. In one option, the actual backoff time is the STA's backoff value multiplied by the associated TU. For example, STA 1 to STA 10 are assigned the backoff numbers n+1 ... n+10, and associated TU1, ..., TU10. Then the actual backoff values of STA1 to STA10 are (n+1)×TU1, (n+2)×TU2, ..., (n+10)×TU10) ms, respectively.

In a second option, the actual backoff time is the first backoff time (backoff value multiplied by associated TU) plus other subsequent associated TUs up to the STA of interest. For example, STA 1 to STA 10 are assigned the backoff numbers n+1 ... n+10, and associated TU1, ..., TU10. Then the actual backoff values of STA1 to STA10 are (n+1)×TU1, (n+1)×TU1+TU2, ..., (n+1)×TU1+sum (TU2, ..., TU10) ms, respectively.

If the calculated backoff time of a STA falls into a beacon transmission time or a RAW that it is not allowed to use, then the calculated backoff time is adjusted accordingly, as in the case of fixed TUs described above.

The value of the associated TU is chosen to be large enough to cover the frames of PS-Poll+SIFS+DATA+SIFS+ACK (or short ACK). The reason that a different TU may be used is because each STA may have a different amount of data and a different ACK policy (for example, a short ACK versus a regular ACK). A predetermined range of the associated TU (such as $K_{min}$ to $K_{max}$ ms) may be used, and the M bits value represents a uniformly quantized TU. That is, $2^M$ levels of uniform quantization is applied to the $K_{min}$ to $K_{max}$ ms.

The AP may signal a positive data indication for STAs that have downlink data buffered at the AP using a TIM bitmap. It may then assign an initial backoff number to STAs and include these assignments in unicast, broadcast management, or control frames, such as a TIM-carrying frame, association response, or other management or control frames. In the case of a TIM-based DL data retrieval scenario, the sequence of STAs that are assigned backoff numbers is signaled implicitly by the TIM bitmap. For the case of a dynamic TU, the AP may calculate the appropriate value of the associated TU for each STA that has a positive data indication in the TIM bitmap.

The AP may then transmit the following information (fields) in the beacon, in addition to the TIM: the associated TU values for each STA that has a positive data indication in the TIM bitmap, and it may include schedules for the controlled contention period, contention-free period, contention-based period, and the like. In the case of a TIM-based DL data retrieval scenario, the AP may choose to transmit buffered downlink packets to a STA when the STA transmits a UL packet, such as a PS-Poll or other trigger packet/frame.

Figure 7:
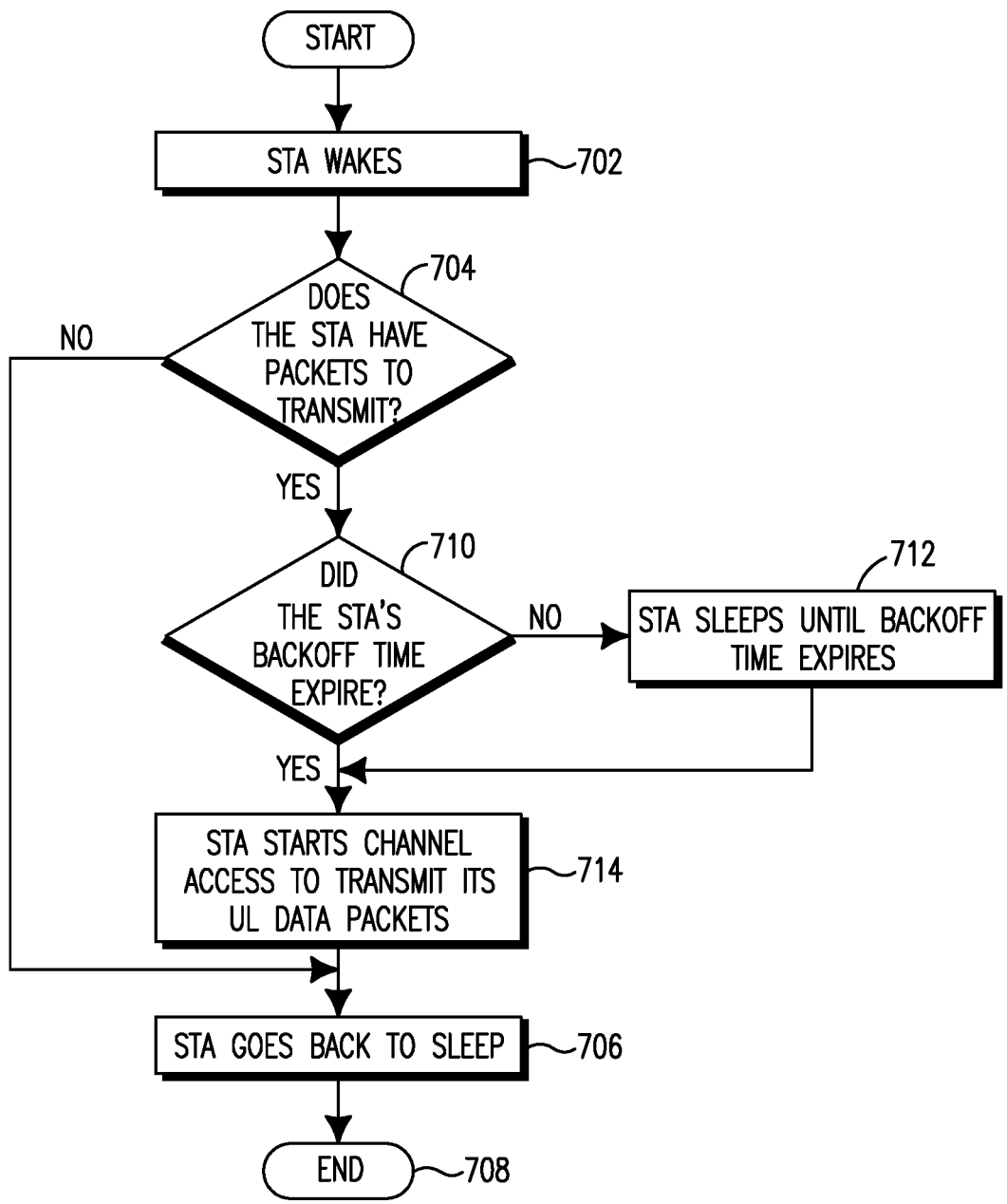
FIG. 7 is a flowchart of a method for a STA to transmit packets.

FIG. 7 is a flowchart of a method 700 for a STA to transmit packets. The STA may wake up at the start of the controlled contention period, beacon interval, or beacon subinterval (step 702). The STA checks whether it has any UL data packets to transmit (step 704). If there are no UL data packets to transmit, then the STA goes back to sleep (step 706) and the method terminates (step 708).

If the STA has UL data packets to transmit (step 704), then a determination is made whether the STA's backoff time has expired (step 710). If not, then the STA sleeps until the backoff time expires (step 712). After the STA's backoff time has expired (steps 710 or 712), then the STA starts channel access to transmit its UL data packets (step 714). The STA then goes back to sleep (step 706) and the method terminates (step 708).

Figure 8:
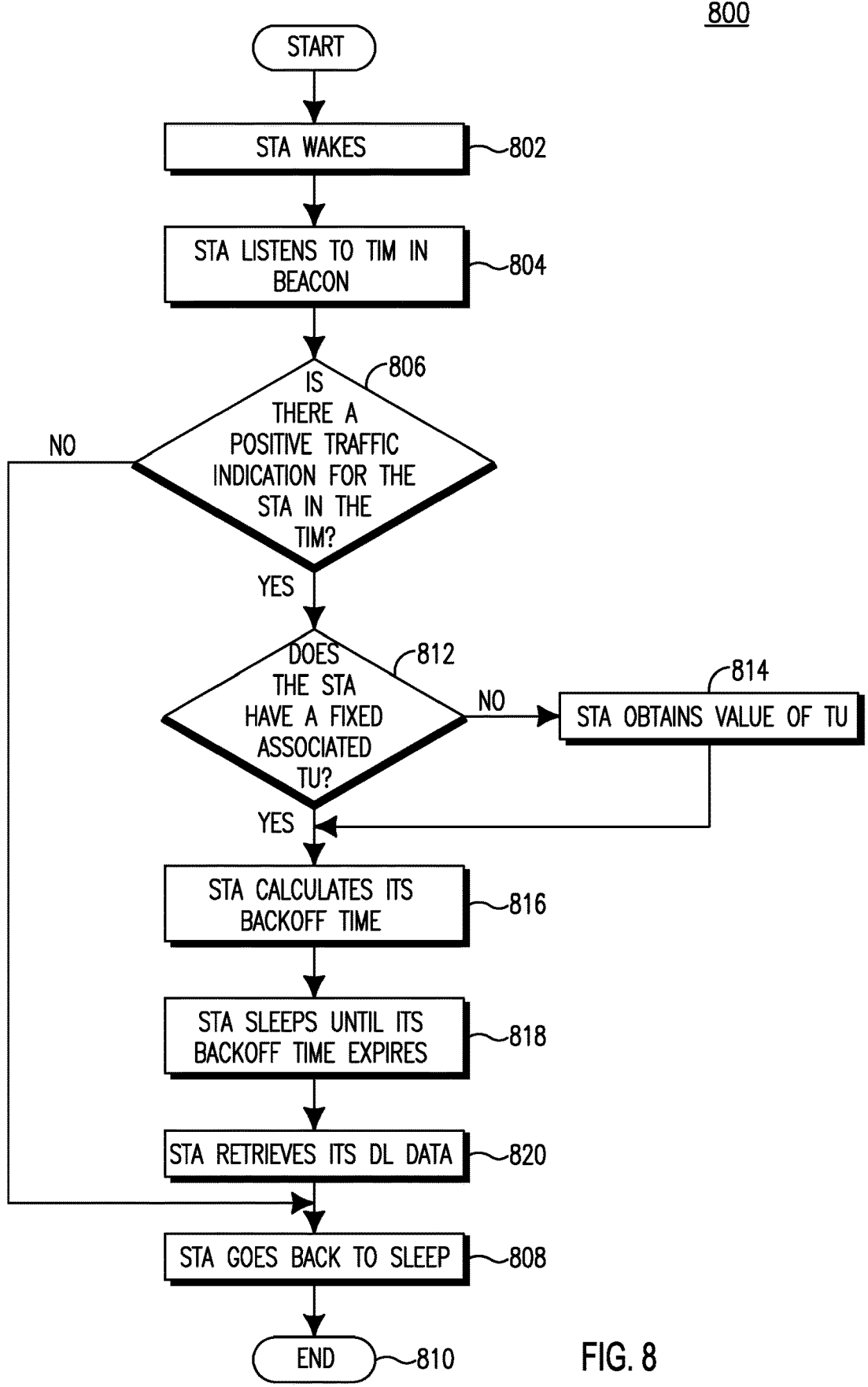
FIG. 8 is a flowchart of a method for a STA to retrieve packets waiting for it.

FIG. 8 is a flowchart of a method 800 for a STA to retrieve packets waiting for it. The STA wakes (step 802) and listens to the TIM in the beacon (step 804). A determination is made whether there is a positive traffic indication for the STA in the TIM (step 806). If there is not a positive traffic indication for the STA in the TIM, then the STA goes back to sleep (step 808) and the method terminates (step 810).

If there is a positive traffic indication for the STA in the TIM (step 806), then a determination is made whether the STA has fixed associated TU (step 812). If the STA does not used a fixed associated TU, meaning that the STA uses a dynamic associated TU, then the STA obtains the value of its associated TU (or all associated TUs of STAs up to itself in the TIM bitmap order) (step 814). If the STA has a fixed associated TU (step 812) or after the STA obtains the value of the TU (step 814), the STA calculates its backoff time (step 816).

The STA then sleeps until its backoff time expires (step 818). The STA then wakes up to retrieve its DL data (step 820). To retrieve the DL data, the STA may send a PS-Poll or other triggering frame to the AP. After retrieving the DL data, the STA goes back to sleep (step 808) and the method terminates (step 810).

For STAs that have not associated with the AP, the initial backoff assignment is more difficult, because no link has been set up between the STAs and the AP. The AP may include in its beacon, probe response, or other broadcast, multicast, or unicast frames the following information: the initial CW size and the initial backoff ranges that have not been assigned by the AP to the STAs that are already associated with the AP. The unassociated STAs may adapt the initial CW size and randomly pick an initial backoff number and then use these parameters to access the medium to associate with the AP.

The controlled contention period may be scheduled a priori by a schedule IE included in the beacon or other management/control frames. To reduce collisions caused by STAs in the OBSS or by newly arrived STAs that are unaware of the scheduling of the controlled contention period, additional medium reservation may be performed by the AP using the following methods.

Method 1: The AP signals the start of the controlled contention period by transmitting a CTS-to-BSS, which is a standard clear to send (CTS) frame with the receiver address (RA) set to a broadcast/multicast address that is agreed upon for the specific BSS. The duration field of the CTS frame is set to equal to the controlled contention period. All STAs that are not part of the BSS set their network allocation vector (NAV) until the end of the contention period, while the STAs in the same BSS may conduct the controlled contention access to the medium.

Method 2: The AP assigns the controlled contention period to start immediately after a beacon, a short beacon, or other type of management or control frame. The duration field of the beacon, short beacon, or other type of management or control frame may be used to set the NAV for the controlled contention period. The beacon, short beacon, or other type of management or control frame also includes schedule information such as an IE, field, or subfield to announce to all STAs in the BSS that the controlled contention period will start immediately after the beacon. When a STA receives a beacon from the AP in the BSS, it ignores the NAV setting of the beacon if the beacon also contains a schedule I E for a controlled contention period immediately following the beacon.

The AP/STA behavior, procedures, and associated signaling may be implemented in a variety of ways. For example, the signaling may be implemented as an IE, a field, or a subfield that are new or existing, a part of MAC/PLOP headers in any type of management, control, or other type of frame. The initial CW size, as well as the initial backoff number assigned, may be conveyed to one or more STAs using signaling such as the Backoff IE, which may be included in beacon, association response, and other broadcast, multicast, or unicast management or control frames.

Figure 9:
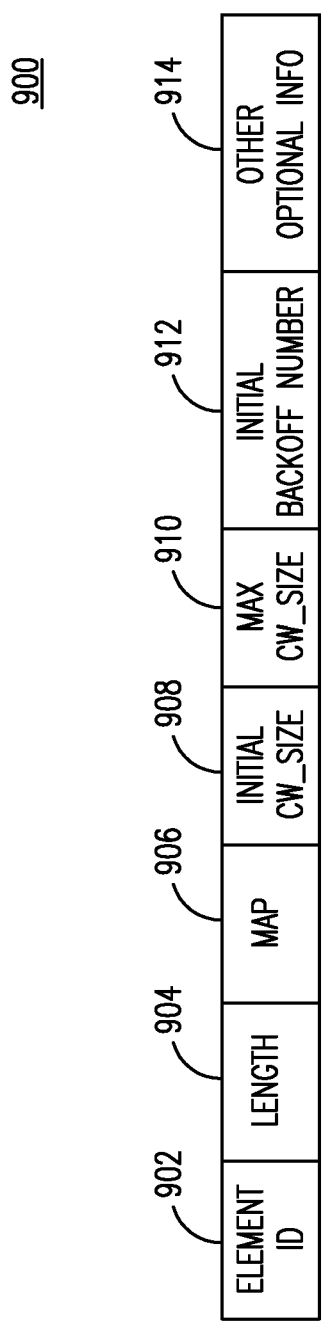
FIG. 9 is a diagram of a backoff information element format.

An example of the Backoff IE format is shown in FIG. 9. The Backoff IE 900 may include the following fields: element ID 902, length 904, MAP 906, initial CW_size 908, maximum CW_size 910, initial backoff number 912, and other optional information 914. The element ID field 902 includes an ID to identify that this is a Backoff IE. The length field 904 is the length in octets of the remainder of the IE. The MAP field 906 indicates the mandatory and optional information contained in the IE. The initial CW_size field 908 is the size of the initial CW that a STA should adapt, and is a mandatory field. The maximum CW_size field 910 is the maximum size of the CW that a STA should adapt, and is an optional field.

The initial backoff number field 912 contains one or multiple initial backoff number(s) assigned to a particular STA. This field is optional and is only included in a unicast frame addressed to one particular STA, for example, in an association response frame or a unicast management or control frame. Alternatively, a field may also be included for one or more STAs that include the assigned initial backoff number. The field may include the IDs for the STAs, such as the AID, MAC addresses, etc. The field may include just the assigned initial backoff numbers for a group of STAs if the IDs of the STAs are implicitly determined. For example, if the assigned initial backoff numbers are provided for a pre-determined group of STAs and the order of the STAs in the group is pre-determined as well, each STA may obtain the assigned initial backoff number according to its order in the group.

The other optional information field 914 contains other optional information, for example, the range of the unassigned (and therefore still available) backoff numbers in the form of the interval [Start_value, End_value] or other forms, any announcement of multiple elements of initial backoff number assignments, or the duration for which the Backoff IE 900 is valid.

Figure 10:
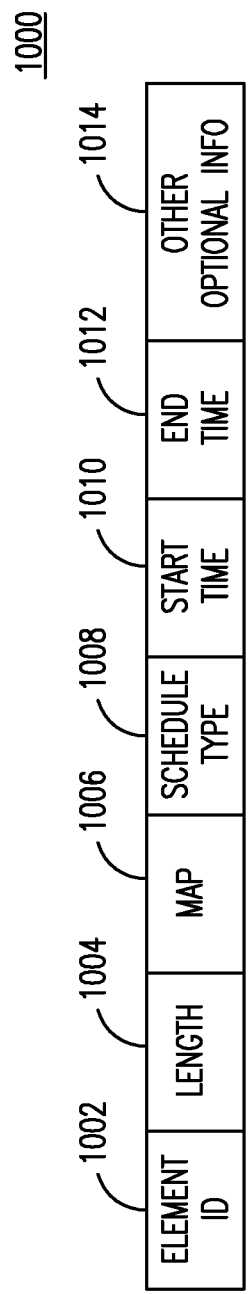
FIG. 10 is a diagram of an interval schedule information element format.

The schedule of the various intervals including the controlled contention interval may be conveyed to the STAs by the AP using the Interval Schedule IE which may be included in beacon, association response, or other management or control frames. An example of the Interval Schedule IE format is shown in FIG. 10.

The Interval Schedule IE 1000 may include the following fields: element ID 1002, length 1004, MAP 1006, schedule type 1008, start time 1010, end time 1012, and other optional information 1014. The element ID field 1002 includes an ID to identify that this is an Interval Schedule IE. The length field 1004 is the length in octets of the remainder of the IE. The MAP field 1006 indicates the mandatory and optional information contained in the IE. The schedule type field 1008 is the schedule is for contention-free interval, controlled contention interval, contention-based interval, etc. The start time field 1010 is the start time of the scheduled interval, counting from the end of the current frame. The end time field 1012 is the end time of the scheduled interval, counting from the end of the current frame.

The other optional information field 1014 includes any one or more of the following: repeat frequency, whether this applies to, for example, all following beacon intervals until further notice; and CW sizes, initial backoff number, or unassigned backoff number range that applies for the scheduled interval.

The CTS-to-BSS may be used by the AP to conduct medium reservation to signal the start of the controlled contention period. The CTS-to-BSS is a standard CTS frame with the RA set to some broadcast/multicast/unicast address that is agreed upon for the specific BSS. The duration field of the CTS frame should be set to equal to the controlled contention period. All STAs that are not part of the BSS set their NAV to the end of the contention period, while the STAs in the same BSS may conduct the controlled contention access to the medium.

The AP calculates the initial CW size based on the expected number of STAs that need to be supported in the BSS or in the specific interval, such as a specific beacon interval. The AP assigns an initial backoff number to the STAs and includes these assignments in unicast, broadcast management, or control frames such as association response or other management or control frames. The AP assigns itself one or more initial backoff numbers for DL transmissions.

The AP transmits the following information (fields) in the beacon or short beacon: the initial CW size to be used, the duration for which the initial CW size is valid, the unassigned backoff value interval for unassociated STAs, a newly assigned or changed backoff number for associated STAs. The beacon optionally includes schedules for the controlled contention period, contention-free period, contention-based period, etc. The AP may also optionally transmit a CTS-to-BSS to indicate the start of the controlled contention period and to reserve the medium. The AP may choose to transmit buffered DL packets to a STA when the STA transmits UL packets.

The STA's behavior during the controlled contention period may include waking up at the start of the controlled contention period. If the STA has no packets to transmit, then the STA goes back to sleep. Alternatively, the STA may also choose to wake up during a normal contention period later if a packet has arrived for transmission during the controlled contention period. In the normal contention period, the STA uses the adaptive CW size and may choose to maintain its assigned initial backoff number or follow the normal random backoff procedure. If no transmission is detected on the medium, the STA waits for a DIFS time, then starts to count down using the initial backoff number(s) assigned to it by the AP.

If the STA counts down to zero and there is no transmission detected on the medium, then the STA transmits the packet. If the transmission is successful, and there are no more packets to transmit, the STA returns to sleep until the next scheduled wake up interval or until the next scheduled contention period. If the transmission is not successful, or if there are more packets to transmit, then the STA uses the additional assigned backoff number in the controlled contention period. Alternatively, the STA may also elect to sleep until the next controlled contention period or normal contention period to transmit the packets.

If the STA has not counted down to zero and transmission is detected on the medium, then if the preamble can be decoded, the STA calculates the length of the packet and returns to sleep until waking up at the end of the ongoing packet. If the preamble cannot be decoded, the STA sleeps for the duration of the shortest packet possible and wakes up to conduct CCA again. If the medium becomes idle, the STA waits for a DIFS time and starts counting down again.

Figure 11:
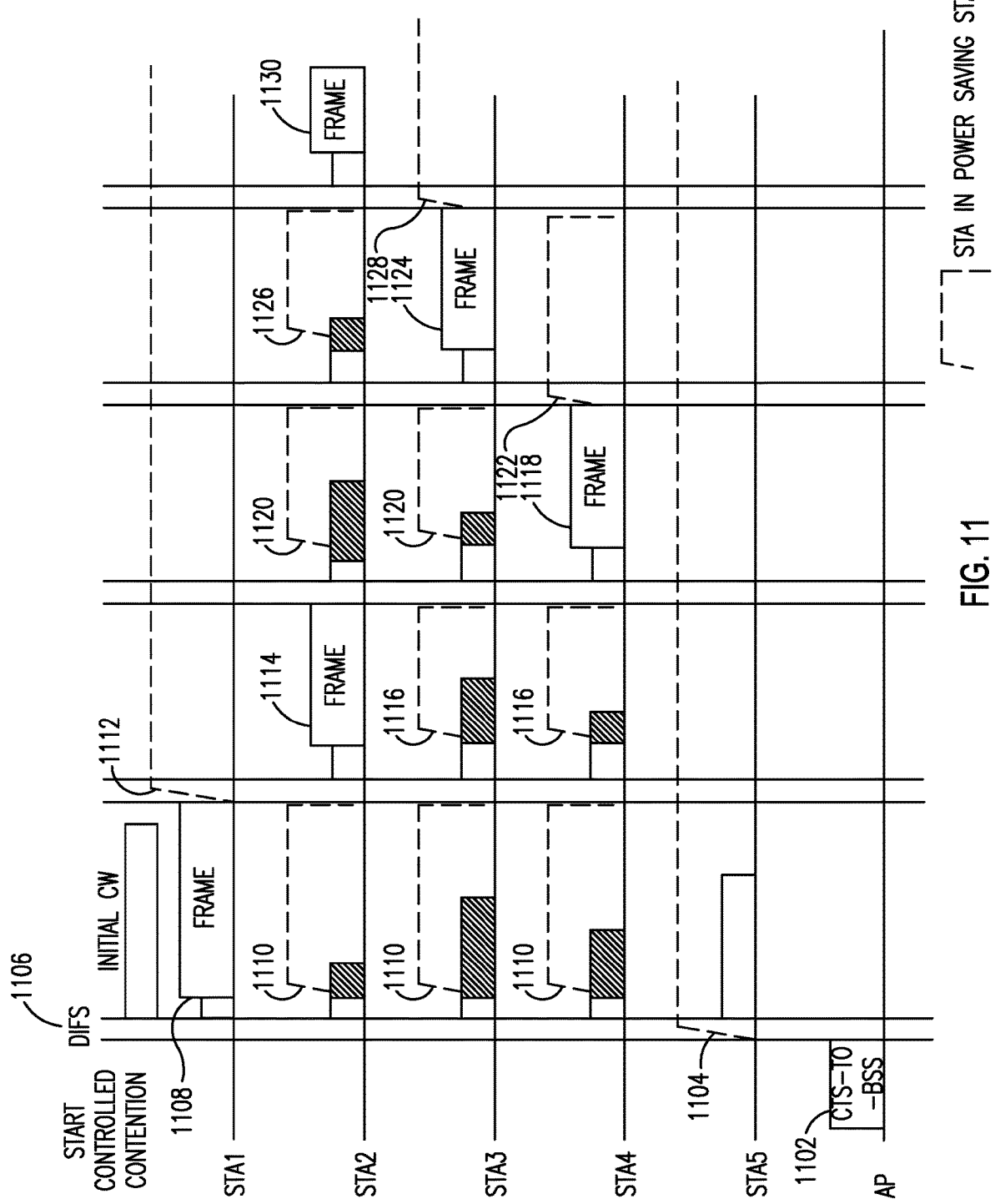
FIG. 11 is an illustration of AP/STA behavior for a controlled contention interval.

During the controlled contention interval, the AP's and STAs' behaviors are illustrated in FIG. 11 as examples. In FIG. 11, the AP indicates the start of the controlled contention period by sending out a CTS-to-BSS (1102), or other type of management or control frame which may also reserve the medium for the duration of the controlled contention period. STA1, STA2, STA3, STA5 are already associated with the AP; STA4 just arrived in the BSS and is looking to associate with the AP. The backoff number assignments for STA1, STA2, STA3 and STA5 are as follows: STA1: 1; STA2: [2,4], which are two backoff numbers for more frequent access to the medium during the controlled contention interval; STA3: 4; and STA5: 5. The unassigned backoff number 4 is announced in the beacon and STA4 randomly selects 4 as its backoff number.

The controlled contention illustrated in FIG. 11 operates as follows. STA5 does not have any packets to transmit during this controlled contention period, so it goes to sleep immediately (1104). All STAs with packets to transmit wait for a DIFS period (1106) and start to count down.

STA1 counts down one slot and starts to transmit its packets (1108). All other STAs sleep after decoding the preamble of the frame transmitted by STA1 (1110). STA1 goes to sleep after completing its frame transmission (1112) until the next scheduled interval.

STA2 counts down one slot and starts to transmit its packets (1114). All other STAs sleep after decoding the preamble of the frame transmitted by STA2 (1116). Since STA2 is assigned two backoff numbers and it has packets to transmit, it will continue participate in the controlled contention process.

STA4 counts down one slot and starts to transmit its packets (1118). All other STAs sleep after decoding the preamble of the frame transmitted by STA4 (1120). STA4 goes to sleep after completing its frame transmission (1122) until the next scheduled interval.

STA3 counts down one slot and starts to transmit its packets (1124). All other STAs sleep after decoding the preamble of the frame transmitted by STA3 (1126). STA3 goes to sleep after completing its frame transmission (1128) until the next scheduled interval.

STA2 counts down two slots and starts to transmit its remaining packets (1130). All other STAs sleep after decoding the preamble of the frame transmitted by STA2.

A large number of devices may be supported through a registered-state based power saving mode. A new power saving mode, the Registered-State Based (RSB) Power Save (PS) mode, is defined, which is an efficient method to notify a large number of devices/STAs that have data buffered at the AP.

When there are a large number of STAs (for example, 6000 STAs, which is more than what the current AID limit of 2007 can support), a new state (the "Registered State") is supported in the BSS. Logically, a STA in the Registered State is associated and authenticated with the AP, i.e., it allows all three classes of frames. But it does not need to have an AID assigned, although it may have an AID. When in the power saving mode, the STA in the Registered State does not need to perform security key updates. For a STA to enter the Registered State, it exchanges registration information (for example, the STA sends RSB-PS operation parameters, e.g., sleep cycle, to the AP and receives a Registration Identifier (RID) assignment) with the AP using MAC management frames, for example, public management frames. The AP manages and assigns the RID to a STA requesting to register with the AP in supporting the RSB-PS mode. The size of the RID is determined by the number of STAs that need to be supported in the Registration State by an AP.

When there is data for an STA in the Registered State, the AP may send the STA traffic indications corresponding to the RID to indicate if there are buffered BUs. Upon receiving a traffic indication of data, the STA in the Registered State takes actions to receive the data from the AP. If the STA in the Registered State has data to transmit, then it takes action to send the data.

The AP may also initiate a state change procedure to request a STA in the associated mode to change to a Registered State. This may be initiated by an AP based on the traffic behavior exhibited by the STA and to manage system resources. The AP may decide to make such a STA state change, for example, to release AIDs given that AIDs are limited in number. The AP may send the state change request to a STA in any frame, such as a management frame. For example, an existing management frame may be modified to include this request or a new management frame may be used for this purpose. If such a STA state change is negotiated successfully, the STA exchanges registration information (for example, the STA sends RSB-PS operation parameters, e.g., sleep cycle, to the AP and receives a RID assignment) with the AP.

The STAs in the Registered State are organized into Traffic Indication Groups (TIGs) when in the power saving operation. The STAs in the same TIG are signaled with their traffic indications in the same traffic indication IE. Each TIG is assigned a unique identifier, called Traffic Indication Group ID (TIG-ID), within the BSS domain. The size of the TIGs, i.e., the number of STAs in a group and the length of the TIG-ID, i.e., the number of groups, depend on the grouping criteria, traffic indication interval, the capability of BU delivery in a traffic indication interval, and the total number of STAs supported by the system. These may be specified as system parameters with a fixed value or configurable system parameters managed through Management Information Bases (MIBs). For example, such information may be configured and broadcast by the AP in frames such as beacons and probe responses.

The grouping criteria may be based on the sleep cycle, delay tolerance, traffic patterns, device ownership, STA type (for example, meters/sensors), applications, locations, etc.

One STA may be assigned to one TIG or multiple TIGs. For example, if traffic patterns are used as grouping criteria, and a STA supports multiple applications with different traffic characteristics, then the STA may be assigned to two different TIGs, one for each application.

For the convenience of illustration, the case where one registered STA is assigned to only one group is used as an example herein.

When in the RSB-PS mode, a STA is identified by a unique RID within the BSS domain. The RID of a STA consists of its TIG-ID and its identification within the TIG, the In-Group STA ID (IG-SID). Similar to the TIG-ID, the size of RID and the size of the IG-SID may be specified as system parameters with fixed values or as configurable system parameters managed through MIBs. For example, such information may be configured and broadcast by the AP in frames such as beacons and probe responses. The RID (instead of the AID) is used in the RSB-PS mode to encode/decode traffic indications for registered STAs. A STA in the registered state may not have an AID assigned.

FIG. 12 shows an example of the RID format 1200, where the RID is two bytes, in which the ten most significant bits (MSBs) are the TIG-ID 1202, and the six least significant bits (LSBs) are the IG-SID 1204. Other lengths of the RID format 1200 (and corresponding combinations of TIG-ID 1202 and IG-SID 1204 lengths) are possible. A RID identifies a unique STA within the BSS domain. With the example of the 16-bit RID, a maximum number of 64K stations may be supported per BSS.

To support the RSB-PS mode, a new traffic indication IE, called the RID-TIM IE, is defined to use the RID to signal the traffic indications for the STAs with buffered BUs at the AP. The RID-based TIM element design includes: one RID-based TIM element for one TIG; an information field to signal the TIG-ID; a partial virtual bitmap to signal the traffic indications for the STAs in the TIG; and indication information to identify the presence of bitmap bytes in the partial virtual bitmap, to minimize the size of the RID-TIM element.

FIG. 13 shows an example of the RID-based TIM element format 1300, where the RID 1302 is 16 bits with a 10-bit TIG-ID field 1304 and a six-bit IG-SID 1306. In the RID-based TIM element shown in FIG. 13, the information fields, element ID, length, DTIM count, and DTIM period are kept the same as the current TIM element as specified by the 802.11 standards, except that a new element ID value is assigned to identify the RID-based TIM element. The 10-bit TIG-ID field 1304 is used to identify the TIG that the RID-TIM element is intended for. For a six-bit IG-SID 1306, there are a maximum of 64 STAs in a TIG. This determines that the full bitmap for 64 STAs will have 64 bits, i.e., eight bytes. To improve the efficiency of the RID-TIM element, not all the eight bytes in the full bitmap are included in the RID-TIM. Instead, a partial virtual bitmap field is used with the length of one to eight bytes. Such a partial virtual bitmap field structure is specified by other information field(s) in the RID-TIM element. For example, as shown in FIG. 13, two index fields, called First Bitmap Byte Index (FBBI) 1308 and Last Bitmap Byte Index (LBBI) 1310, indicate the first and the last bitmap bytes in the partial virtual bitmap field 1312, respectively. The bitmap bytes before the FBBI 1308 are all of the value zero, and so are the bitmap bytes after the LBBI 1310. For example, for the following given full bitmap:

| Byte-0 | Byte-1 | Byte-2 | Byte-3 | Byte-4 | Byte-5 | Byte-6 | Byte-7 |
|---|---|---|---|---|---|---|---|
| 0x00 | 0x00 | 0xA1 | 0x00 | 0x58 | 0xF3 | 0x00 | 0x00 |

The values of FBBI, LBBI, and the partial virtual bitmap are:
FBBI=0b010
LBBI=0b101
Partial virtual bitmap=0xA1 0x00 0x58 0xF3

Alternatively, instead of using two byte-index fields in the RID-based TIM element to identify the structure of the partial virtual bitmap, a bitmap control field may be used to indicate the presence of the traffic indication bitmap bytes in the partial virtual bitmap field. Each bit in the control field corresponds to a bitmap byte index in the full TIM bitmap. A value of one indicates "present" as at least one bit in the TIM bitmap byte is non-zero; and a value of zero indicates "not present" as all the bits in the corresponding bitmap byte are zero. In this way, the partial virtual bitmap field contains only the bitmap bytes with non-zero values.

Special TIG IDs are reserved to indicate broadcast traffic and non-TIG-based multicast traffic. Table 1 shows an example using the 16-bit RID with a 10-bit TIG-ID and a 6-bit IG-SID.

TABLE 1

RID-Based Broadcast/Multicast Identifications

| Registration ID (RID) | | Descriptions |
|---|---|---|
| TIG | IG-SID | |
| 0b0000 0000 00 to 0b1111 1111 01 | any | Unicast RIDs, used to identify individually addressed STAs for DL traffic indications. |
| 0b1111 1111 10 | Multicast ID | Multicast RIDs (MRIDs), used to identify multicast groups for DL multicast traffic indications. |
| 0b1111 1111 11 | Not used, set to all 0s | Broadcast RID (BRID), used for broadcast traffic indications. |

FIG. 14 shows an example of a RID-based TIM element 1400 with a bitmap control field 1402 for the partial virtual bitmap 1404. Using the same example of a given full bitmap, i.e.,

| Byte-0 | Byte-1 | Byte-2 | Byte-3 | Byte-4 | Byte-5 | Byte-6 | Byte-7 |
|---|---|---|---|---|---|---|---|
| 0x00 | 0x00 | 0xA1 | 0x00 | 0x58 | 0xF3 | 0x00 | 0x00 |

The values of the bitmap control field 1402 and the partial virtual bitmap 1404 are:
Bitmap Control=0b00101100
Partial virtual bitmap=0xA1 0x58 0xF3

In addition, the RID-based TIM element may be further improved for the TIG based on multicast traffic indication, by using one control bit to indicate the multicast traffic in the group and having an empty partial virtual bitmap (i.e., zero bytes), instead of including a full bitmap with all "1"s.

The RID-based TIM element supports up to 64K STAs. It provides an efficient method to notify the STAs that have data buffered at the AP by grouping the STAs. The STAs may be grouped based on, for example, the traffic patterns, the BU delivery capability in the traffic indication interval, etc. The RID-based TIM element achieves a performance enhancement when it is applied to the STA status-based RID-TIM scheme, as described below.

The RID-based TIM element may be used in the management frames where the current TIM element may appear, for example, a beacon frame, a TIM broadcast frame, etc. Depending on the STAs and their applications in a BSS, the RID-based TIM element may co-exist with the current TIM element in the same management frame or may be used alone by itself in the management frames. Also, in addition to the current management frames, the RID-based TIM element may also be used in a new management frame.

The RID-based TIM element is for an individually addressed traffic indication and TIG-based multicast traffic indication. To support broadcast traffic and non-TIG-based multicast traffic indication and delivery, one method is to use the current broadcast/multicast traffic indication/delivery schemes, e.g., the DTIM scheme, as specified in the current 802.11 standards. Alternatively, a new method may be based on the RID to support broadcast traffic and non-TIG-based multicast traffic indication and delivery in the RSB-PS mode.

The multicast group is different from the TIG, as the multicast group is used for multicast data delivery, while the TIG is used for traffic indication, not for traffic delivery. A multicast group may contain any number of STAs, and it is formed and maintained through corresponding procedures and rules. There may be multiple multicast groups, each identified by a unique Multicast ID (MID) within a BSS domain.

The STA status information may also be used to further improve the efficiency of the RID-TIM, called a STA status based RID-TIM. The Registered STAs may be grouped based on their listening windows, where the listening window means the time duration in which the STA is in the listening status. The AP uses the STA status information to assemble the partial virtual bitmap in the RID-TIM element for the STAs in the RSB-PS mode, so that the partial virtual bitmap only contains the positive traffic indications for the STAs in the listening status at the time when the frame containing the RID-TIM element is transmitted. When the STA status information is used to group the STAs in the RSB-PS mode, the STAs with positive traffic indications at a given time are further clustered under the same TIG, resulting in an efficient use of the RID-TIM scheme.

Similar to the current 802.11 power saving mode operation, a DL BU delivery request signal may be used in the RSB-PS mode for the STAs to request the delivery of the buffered BUs, after receiving positive traffic indications in the RID-TIMs. The current PS-Poll control frame cannot be used for the RSB-PS mode, because it uses the AID in its MAC header, while a STA in RSB-PS mode may not have an AID. Two solutions are proposed to address this DL BU delivery request signaling issue in RSB-PS mode.

A new control frame, the RSB-PS-Poll frame, is defined for the STAs in the RSB-PS mode to request DL BU delivery after receiving a positive traffic indication in the RID-TIM, by using one of the reserved control frame subtype values. The RSB-PS-Poll frame may have the same format as the PS-Poll frame, except that the ID field in the MAC header is set to the RID of the transmitting STA, instead of the AID.

The STAs in RSB-PS mode use the current PS-Poll control frame to request DL BU delivery after receiving a positive traffic indication in the RID-TIM by setting the ID field in its MAC to an invalid AID value. When the AP receives a PS-Poll frame with an invalid value in the ID field, it ignores the ID field, and uses the source MAC address field to identify the transmitting STA of the PS-Poll frame.

The following solutions relate to the address issues when using the PSMP (Power Saving Multi-Poll) scheme for the STAs in the RSB-PS mode, as the current PSMP scheme specified in the 802.11 standards uses the AID to identify the STAs for the DTT (Downlink Transmission Time) and UTT (Uplink Transmission Time) allocations. But, the STAs in the RSB-PS mode may not have AID assigned.

A new PSMP frame, the RSB-PSMP frame, is defined by assigning a new HT Action code point. The RSB-PSMP frame may have the same format as the PSMP frame specified in the current 802.11 standards, except that the 16-bit STA-ID field is set to the RID, instead of the AID. Alternatively, the current PSMP frame is used by assigning a new STA_Info Type value to identify the STAs in the RSB-PS mode, and also setting the STA-ID filed to the RID, not the AID.

An authenticated/associated STA in the RSB-PS mode is assigned a RID by the AP in the BSS, then the STA is "registered" with the AP. The RID assignment may be done by including a new IE, the RID assignment element, in an association response management frame or a new MAC management frame.

The RSB-PS mode may use the same operation parameters, for example, ListenInterval, ReceiveDTIMs, etc., as specified and signaled in the current 802.11 standards. Alternatively, the RSB-PS mode operation parameters may be configured and signaled by a new set of MAC sublayer management entity (MLME) primitives and IEs included in existing or new management frames at the time the RID is assigned. Such a new set of power saving parameters may allow different ranges of values, for example, a longer sleep interval.

Before or at registration, the RSB-PS capability may be communicated between the AP and the STA through either an explicit RSB-PS capability indication or an implicit signaling mechanism, for example, RSB-PS parameter negotiation and acknowledgement. After registration, the STA is ready for RSB-PS mode operation.

A registered STA needs to follow the entering RSB-PS mode procedure to enter the RSB-PS mode operation. A registered STA may enter the RSB-PS mode by using the current procedures for entering the power save mode, i.e., by using the power management subfield in the frame control field in the MAC header.

Alternatively, entering the RSB-PS mode may be based on an explicit handshaking procedure. For example, a set of new MAC management frames may be introduced to request/response or command/acknowledge the entry of the RSB-PS mode operation. The handshaking procedure may also include the RID assignment and the RSB-PS operation parameter setup, such that all the steps of initializing the RSB-PS mode operation are conducted in the same procedure.

The RSB-PS mode operation does not need the AID. When entering the RSB-PS mode, the AID of the STA may be released or it may be kept. If kept, nothing about the AID needs to be done. If the AID is released, it may be released implicitly by a successful entry to the RSB-PS mode when the RSB-PS mode is configured to always release the AID when entering the RSB-PS mode. Alternatively, releasing the AID may be done explicitly by including an AID release indicator in the signaling of entering the RSB-PS mode procedure. A released AID may be re-assigned to other STAs.

Similar to the current PS (Power Saving) mode operation, a STA in the RSB-PS mode alternates between an available (also called listening or awake) state and not-available (also called not-listening or doze) state. When in the not-available state, the STA may partially or fully turn off its transmitter and receiver to save power. The operation procedures of the RSB-PS mode and the current PS mode have some differences, mainly because a STA in the RSB-PS mode may not have an AID assigned, while the AIDs are used in the current PS mode operations. In addition, a longer doze interval may be supported by the RSB-PS mode, as compared to the PS mode.

The following describes the differences of the RSB-PS mode operation from the PS mode operation.

DL traffic indication: The RID-TIM element is used for the STAs in RSB-PS mode.

DL buffered BUs delivery: The RID-based PS-Poll control frame, e.g., the RID-PS-Poll, is used for the STA in the RSB-PS mode to request the buffered BUs delivery from the AP, after receiving a positive traffic indication for it. Alternatively, the AP may deliver the DL buffered BUs immediately after sending the traffic indications, without waiting for a request, e.g., RID-PS-Poll, from the STA, particularly when using the STA status-based traffic indication scheme.

DL buffered broadcast/multicast BUs delivery: To support more efficient power savings by allowing long doze intervals, the STAs in the RSB-PS mode may not need to wake up based on the signaled broadcast/multicast traffic indication/delivery intervals, for example, the DTIM interval. Instead, the buffered broadcast/multicast BUs may be delivered on a TIG basis only when the STAs are in their listening window. Alternatively, it may depend on the applications or upper layers of the broadcast/multicast BUs to handle the synchronizations needed in the broadcast/multicast data communications.

UL traffic transmission: A STA in the RSB-PS mode may wake up at any time during its doze interval when it has UL data to transmit. Alternatively, it may also buffer the UL BUs until its next periodic listening window.

Security key update: To support a long doze interval, particularly a period longer than some security key refreshing interval (if any), a STA in the RSB-PS mode may not need to wake up just for key refreshment. Instead, the key updates may be conducted the next time the STA enters its listening window or wakes up for its UL data transmission. In this case, certain signaling supports may be used to accelerate the key refreshment, for example, including key update information in the DL traffic indication or PS-Poll control signal.

When applying the PSMP (Power Saving Multi-Poll) scheme to the STAs in RSB-PS mode, the RID based PSMP scheme is used.

A STA in the RSB-PS mode may terminate its RSB-PS mode operation by using the current terminating PS operation procedure, i.e., by using the power management subfield in the frame control field in the MAC header. Alternatively, the termination of the RSB-PS mode may be based on an explicit handshaking procedure, for example, a set of new MAC management frames are introduced to request/response or command/acknowledge the termination of the RSB-PS mode operation.

If a STA in the RSB-PS mode does not have an AID (i.e., it released its AID when entering the RSB-PS mode), it will have an AID assigned as part of its RSB-PS mode termination process or immediately following it. In addition, as part of the RSB-PS mode termination process, the system parameters for system configurations, including security keys, may also be checked to confirm if the STA has the synchronized system settings with the AP.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method comprising:
receiving a time value at a station;
receiving a traffic indication map (TIM) element at the station, the TIM element indicating a positive indication for a group of stations having traffic that is pending;
determining an offset for the station as a function of a position of the station within the group of stations; and
determining a medium access backoff time for the station based on the determined offset and the received time value.

2. The method of claim 1, wherein the time value is a fixed value.

3. The method of claim 1, wherein the time value is received at the station via a beacon or a short beacon.

4. The method of claim 1, further comprising:
setting a backoff timer at the station with the medium access backoff time; and
attempting to send a communication by the station after the backoff timer has expired.

5. The method of claim 1, wherein the medium access backoff time is a slot time.

6. The method of claim 1, further comprising signaling the medium access backoff time using at least one of a beacon or a short beacon.

7. The method of claim 1, wherein the position is associated with the positive indication in the TIM element.

8. The method of claim 1, wherein the position is an index of an association identifier (AID) of the station.

9. The method of claim 1, further comprising determining a slot in which the station is configured to contend for the medium based on the medium access backoff time for the station.

10. The method of claim 1, wherein the station is a STA.

11. A station comprising:
a processor and a transceiver communicatively coupled to:
receive a time value at a station;
receive a traffic indication map (TIM) element at the station, the TIM element indicating a positive indication for a group of stations having traffic that is pending;
determine an offset for the station as a function of the position of the station within the group of stations; and
determine a medium access backoff time for the station based on the determined offset and the received time value.

12. The station of claim 11, wherein the time value is a fixed value.

13. The station of claim 11, wherein the time value is received at the station via a beacon or a short beacon.

14. The station of claim 11, the processor and a transceiver communicatively coupled to further:
set a backoff timer at the station with the medium access backoff time; and
attempt to send a communication by the station after the backoff timer has expired.

15. The station of claim 11, wherein the medium access backoff time is a slot time.

16. The station of claim 11, the processor and a transceiver communicatively coupled to further signal the medium access backoff time using at least one of a beacon or a short beacon.

17. The station of claim 11, wherein the position is associated with the positive indication in the TIM element.

18. The station of claim 11, wherein the position is an index of an association identifier (AID) of the station.

19. The station of claim 11, the processor and a transceiver communicatively coupled to further determine a slot in which the station is configured to contend for the medium based on the medium access backoff time for the station.

20. The station of claim 11, wherein the station is a STA.

* * * * *